March 3, 1953  E. B. MILLER  2,630,374
METHOD FOR THE RECOVERY OF ELEMENTAL SULFUR IN LIQUID FORM
FROM GASES CONTAINING HYDROGEN SULFIDE, AND THE CONVERSION
OF THE LIQUID SULFUR INTO SOLIDIFIED FLAKES
Filed March 12, 1951                                    11 Sheets-Sheet 1
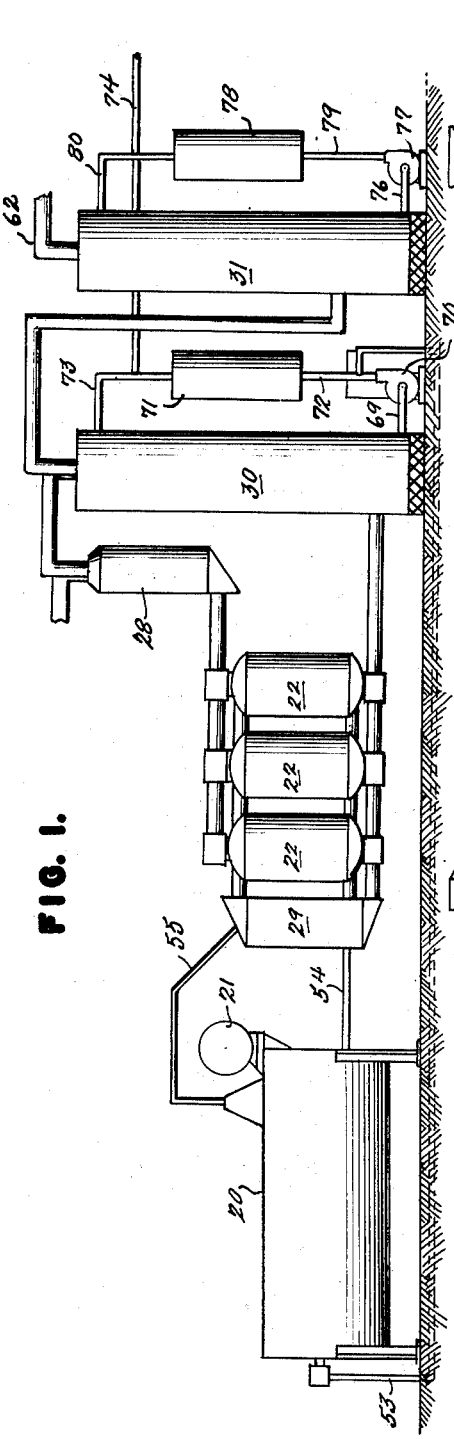
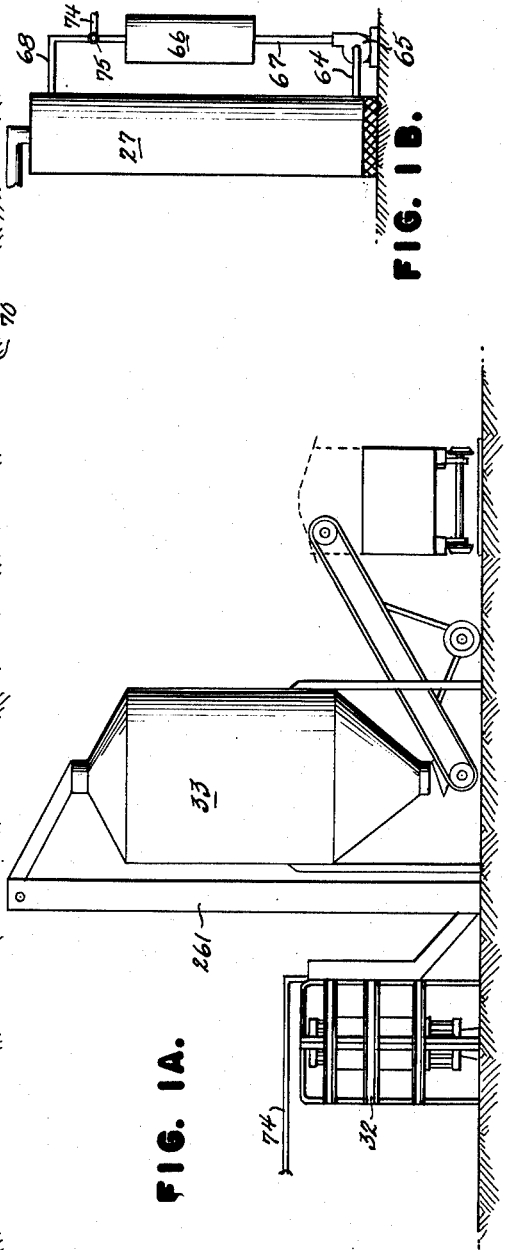
INVENTOR
ERNEST B. MILLER
BY *Adams & Bush*
ATTORNEYS March 3, 1953 E. B. MILLER 2,630,374
METHOD FOR THE RECOVERY OF ELEMENTAL SULFUR IN LIQUID FORM
FROM GASES CONTAINING HYDROGEN SULFIDE, AND THE CONVERSION
OF THE LIQUID SULFUR INTO SOLIDIFIED FLAKES
Filed March 12, 1951 11 Sheets-Sheet 2
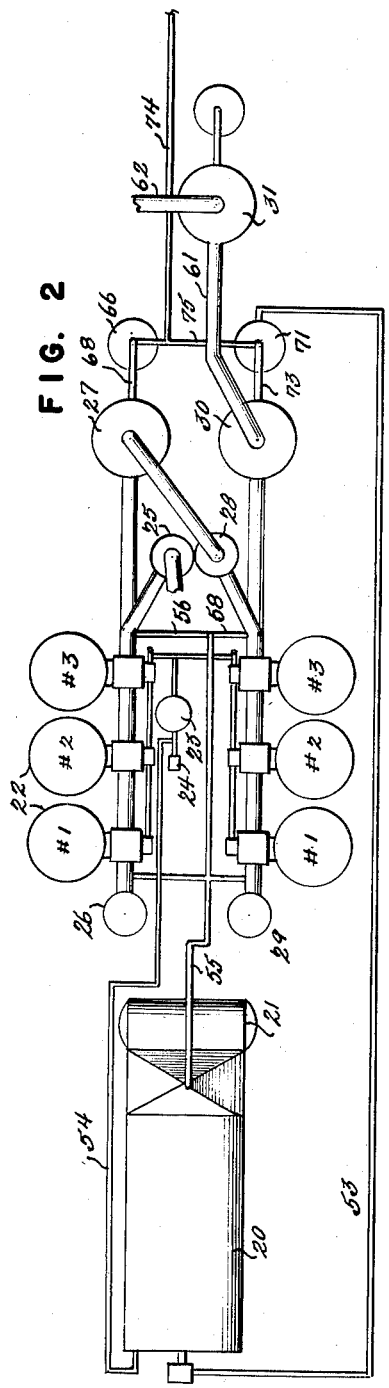
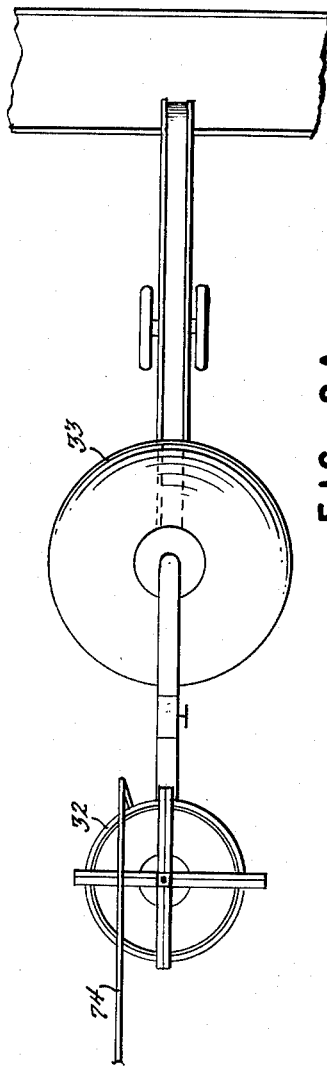
INVENTOR
ERNEST B. MILLER
BY Adams & Bush
ATTORNEYS

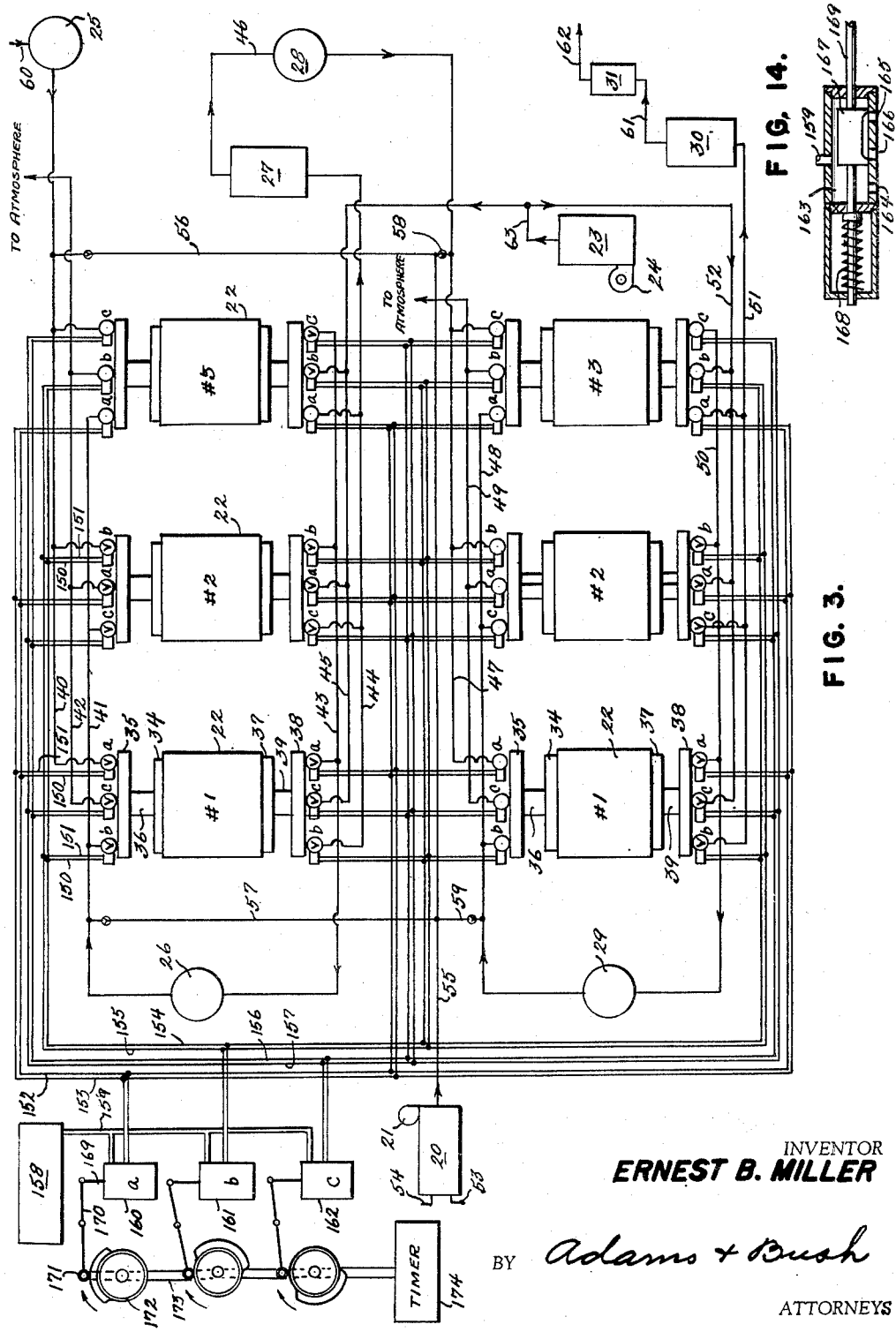

March 3, 1953  E. B. MILLER  2,630,374
METHOD FOR THE RECOVERY OF ELEMENTAL SULFUR IN LIQUID FORM
FROM GASES CONTAINING HYDROGEN SULFIDE, AND THE CONVERSION
OF THE LIQUID SULFUR INTO SOLIDIFIED FLAKES
Filed March 12, 1951  11 Sheets-Sheet 4
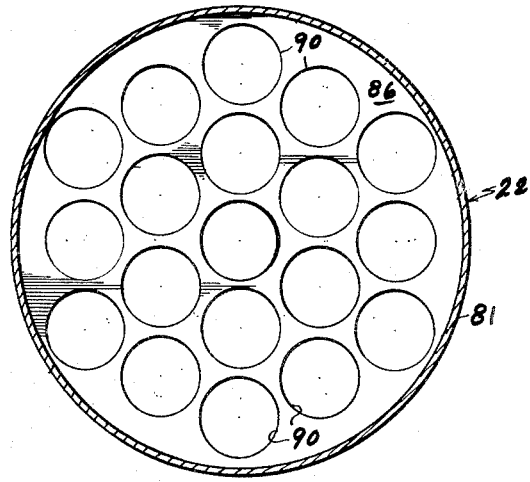
FIG. 6.
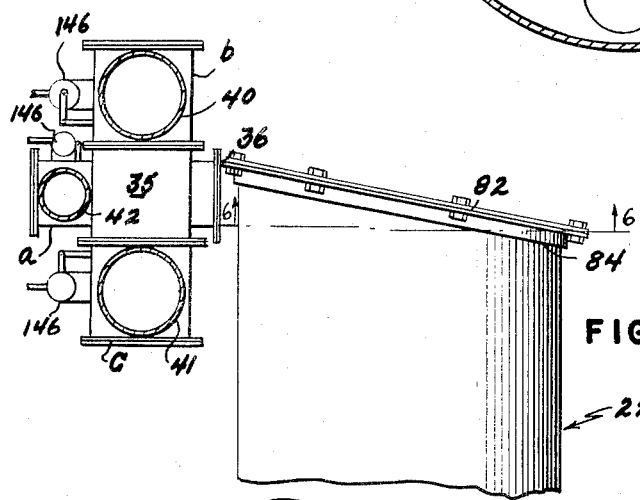
FIG. 4.
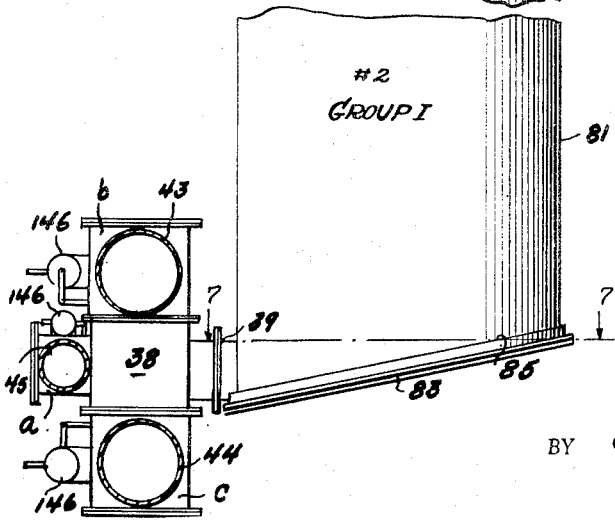
INVENTOR
ERNEST B. MILLER
BY Adams & Bush
ATTORNEYS March 3, 1953　　　　　　　E. B. MILLER　　　　　　2,630,374
METHOD FOR THE RECOVERY OF ELEMENTAL SULFUR IN LIQUID FORM
FROM GASES CONTAINING HYDROGEN SULFIDE, AND THE CONVERSION
OF THE LIQUID SULFUR INTO SOLIDIFIED FLAKES
Filed March 12, 1951　　　　　　　　　　　　　　　11 Sheets-Sheet 5

INVENTOR
ERNEST B. MILLER

BY　*Adams & Bush*

ATTORNEYS

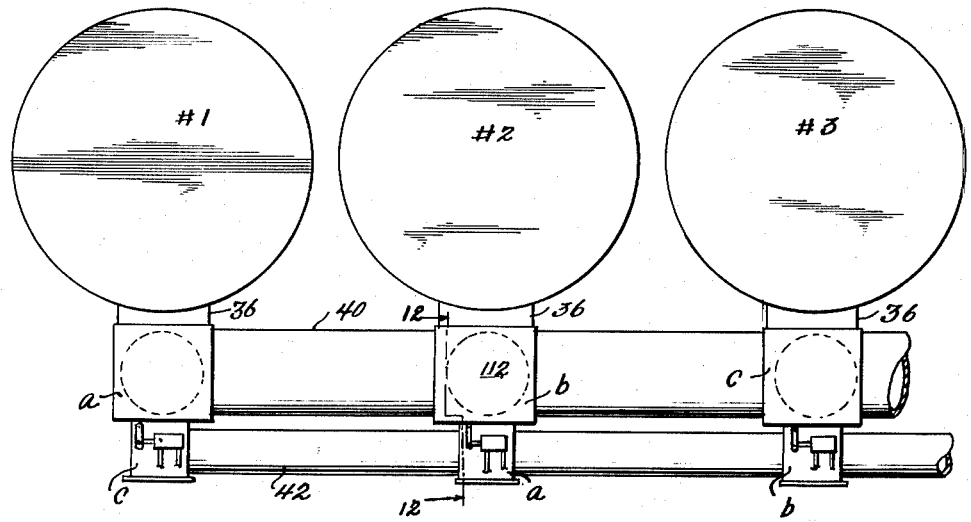
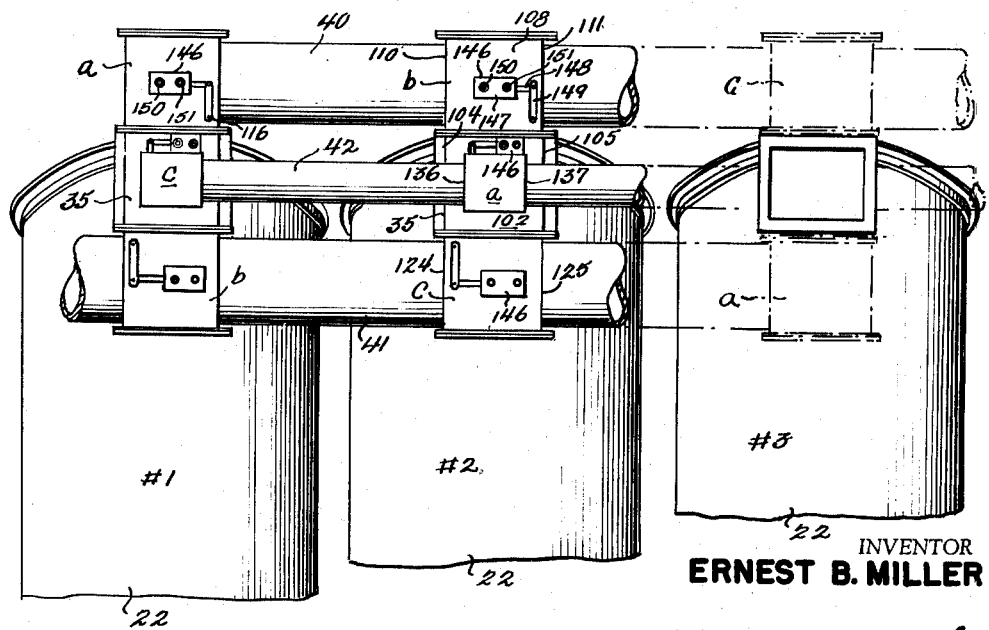

March 3, 1953     E. B. MILLER     2,630,374
METHOD FOR THE RECOVERY OF ELEMENTAL SULFUR IN LIQUID FORM
FROM GASES CONTAINING HYDROGEN SULFIDE, AND THE CONVERSION
OF THE LIQUID SULFUR INTO SOLIDIFIED FLAKES
Filed March 12, 1951     11 Sheets-Sheet 7

INVENTOR
ERNEST B. MILLER
BY Adams & Bush
ATTORNEYS

March 3, 1953 E. B. MILLER 2,630,374
METHOD FOR THE RECOVERY OF ELEMENTAL SULFUR IN LIQUID FORM
FROM GASES CONTAINING HYDROGEN SULFIDE, AND THE CONVERSION
OF THE LIQUID SULFUR INTO SOLIDIFIED FLAKES
Filed March 12, 1951 11 Sheets-Sheet 9

INVENTOR
ERNEST B. MILLER
BY Adams & Bush
ATTORNEYS

March 3, 1953 E. B. MILLER 2,630,374
METHOD FOR THE RECOVERY OF ELEMENTAL SULFUR IN LIQUID FORM
FROM GASES CONTAINING HYDROGEN SULFIDE, AND THE CONVERSION
OF THE LIQUID SULFUR INTO SOLIDIFIED FLAKES
Filed March 12, 1951 11 Sheets-Sheet 10

INVENTOR
ERNEST B. MILLER

BY *Adams & Bush*

ATTORNEYS

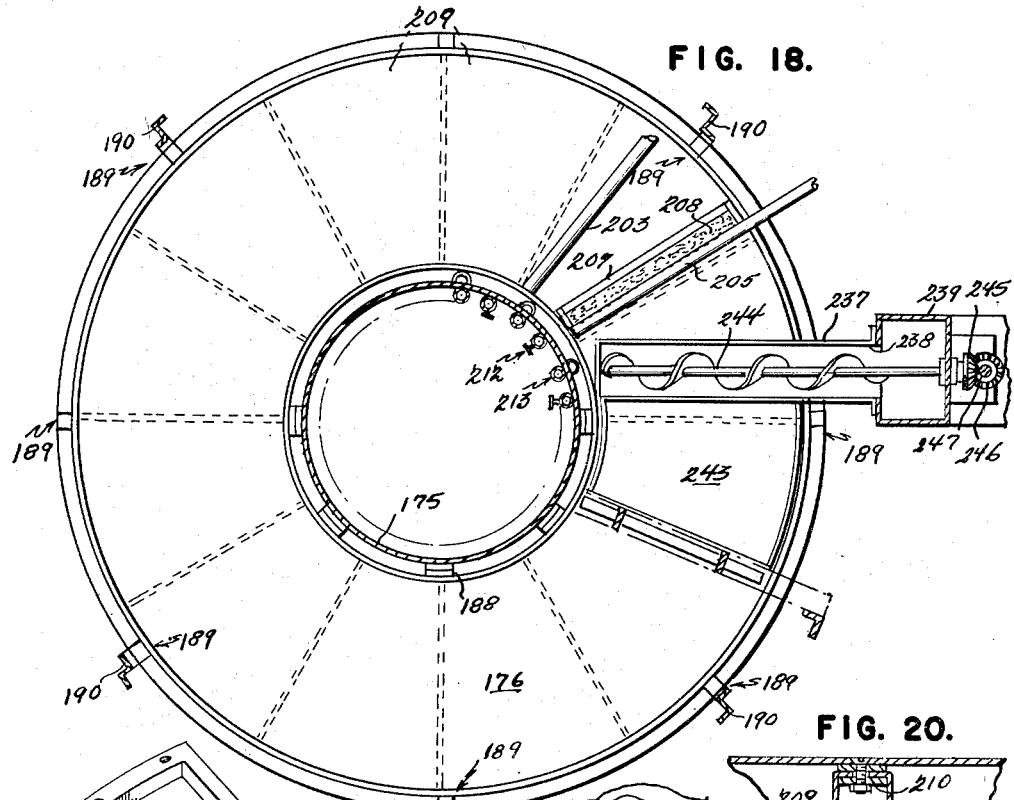
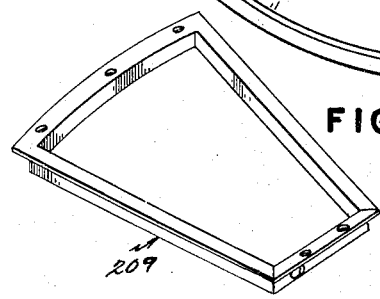
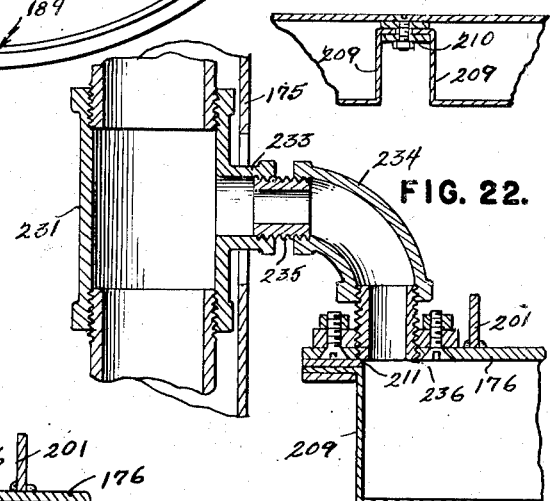
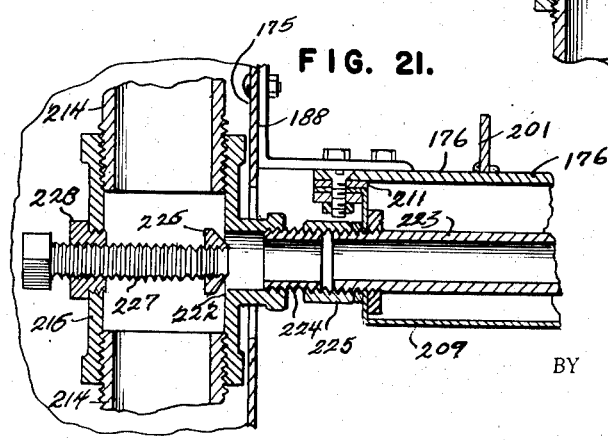
INVENTOR
ERNEST B. MILLER
BY Adams & Bush
ATTORNEYS Patented Mar. 3, 1953

2,630,374

UNITED STATES PATENT OFFICE 2,630,374

METHOD FOR THE RECOVERY OF ELEMENTAL SULFUR IN LIQUID FORM FROM GASES CONTAINING HYDROGEN SULFIDE AND THE CONVERSION OF THE LIQUID SULFUR INTO SOLIDIFIED FLAKES

Ernest B. Miller, Houston, Tex., assignor to Jefferson Lake Sulphur Company, New Orleans, La., a corporation of New Jersey Application March 12, 1951, Serial No. 215,178

4 Claims. (Cl. 23—225)

This invention relates to the recovery of sulphur from gases containing sulphur compounds and has more particular reference to a method of and apparatus for the recovery of elemental sulphur in liquid form from gases containing hydrogen sulphide, and the conversion of the liquid sulphur into solidified flakes.

The object of the present invention is to provide a novel method of and apparatus for the recovery of elemental sulphur from gases containing $H_2S$ by catalytically desulphurizing the gas to obtain liquid sulphur and then converting the liquid sulphur into sulphur flakes.

Another object of the invention is to provide a novel method of and system for the continuous recovery of elemental sulphur from gases containing $H_2S$ in which a catalyst is used which is able to effect a highly efficient conversion of $H_2S$ to $H_2O$ and sulphur and in which the catalyst, after it has become spent, due to chemical reduction of the catalytic agent or the deposition of carbon or other contaminants from the gas being treated, may be fully restored to its initial efficiency by reactivation with hot air.

Another object of the invention is to provide a system, as characterized above, wherein a series of at least three reactors are employed and the gas to be treated passes in succession through at least two reactors in the series before being scrubbed, and wherein a regenerating medium is passed through the third reactor in the series and wherein automatic control means are provided for shifting the flow through the reactors so that the last flow of the gas will be through the reactor with the freshest catalyst and the first flow of the gas will be through the reactor with the most spent catalyst.

Another object of the invention is to provide a novel method of and system for the continuous recovery of elemental sulphur from gases containing $H_2S$, as characterized above, wherein the temperature rise in each oxidation stage is controlled by controlling the supply of oxidation gas to such stages.

Another object of the invention is to provide a novel method of and system for the continuous recovery of elemental sulphur from gases containing $H_2S$, as characterized above, wherein a portion of the liquid sulphur being recovered is returned to a sulphur burner, where it is burned to supply the oxidant required to oxidize the $H_2S$ in the gas being processed.

Another object of the invention is to provide a system, as characterized above, including apparatus for continuously converting the recovered liquid sulphur into solidified sulphur flakes.

Another object of the invention is to provide a system, as characterized above, wherein the sulphur flaking apparatus includes a plurality of rotatable water jacketed annular plates; means for depositing a layer of liquid sulphur superimposed upon a film of water on the upper surfaces of the plates; and means for cracking and removing the layers of deposited sulphur after they have solidified.

Other objects and advantages of the invention will appear in the following specification when considered in connection with the accompanying drawings, wherein:

Figs. 1 and 1A are diagrammatic elevational views of apparatus embodying the invention, Fig. 1A being a continuation of Fig. 1;

Fig. 1B is a detail elevational view of the first scrubbing tower with its appurtenances;

Figs. 2 and 2A are plan views of the apparatus shown in Figs. 1 and 1A, Fig. 2A being a continuation of Fig. 2;

Fig. 3 is a diagrammatic view showing the flow of the gas to be treated, the flow of the oxidant, and the flow of the regenerating medium through the reactors;

Fig. 4 is a side view, with parts broken away, of a reactor showing the manner in which it is connected to the upper and lower headers;

Fig. 6 is a sectional view taken on the line 6—6 of Fig. 4;

Fig. 10 is a plan view of one group of reactors;

Fig. 11 is a front elevational view, with parts omitted, of the group of reactors shown in Fig. 10;

Fig. 14 is a vertical sectional view of one of the D valves shown in Fig. 3;

Fig. 18 is a horizontal sectional view, with parts omitted, taken on the line 18—18 of Fig. 15;

Fig. 19 is a perspective view of a water jacketing pan;

Fig. 20 is a detail view showing how the water jacketing pans are secured to the annular plates;

Fig. 21 is a vertical sectional detail view showing the manner in which an inlet water connection is made to the pan;

Fig. 22 is a vertical sectional detail view showing the manner in which an outlet water connection is made to the pan;

Figure 8:
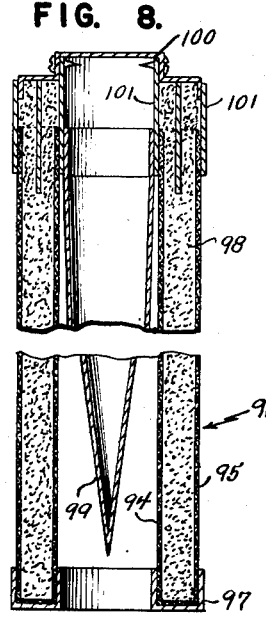
Fig. 8 is a vertical sectional view, with parts broken away, of a tubular container.

In general, the invention comprises a method of and apparatus for the catalytic desulphurization of acidic gases such as gases containing $H_2S$ and/or $CS_2$, the recovery of elemental sulphur therefrom in liquid form, and the conversion of the liquid sulphur into solidified flakes. The method of the present invention is similar to the method described in my copending application, Ser. No. 215,181, filed March 12, 1951, for Method of Catalytic Desulphurization of Gases, in that the $H_2S$ oxidant reaction is so conducted that the liberated elemental sulphur is maintained in the vapor form and subsequently condensed after passing through the catalyst. However, in the aforesaid copending application, catalyst beds are rotated through a plurality of reaction zones and a reactivation zone, whereas, in the present method, a continuous flow of the gas to be treated is directed through two or more successive reaction zones containing stationary catalyst, while a continuous flow of a heated regenerating medium is directed through an additional zone containing stationary catalyst and the flows of the gas and the regenerating medium are periodically shifted so that each of the several zones becomes, in succession, a reactivation zone, and in reverse order to the flow of gases therethrough, each a successive reaction zone.

For the purpose of illustration, the invention will be described in connection with the catalytic desulphurization of sour natural gas and the recovery of elemental sulphur therefrom in flake form.

Referring now to the drawings, there is shown in Figs. 1 and 2, one embodiment of apparatus and the arrangement thereof for carrying out the method of this invention. The apparatus shown includes a sulphur burner 20 in which a mixture of liquid sulphur and air is burned to produce a gas of combustion having as high an $SO_2$ content as possible, preferably 19%–20%; a waste heat boiler 21 which utilizes the heat of the gases of combustion in the sulphur burner to generate steam for running auxiliary machinery and other purposes; a plurality of catalytic reactors 22 (six such being shown as formed into two groups with three reactors in each group); a heater 23 for heating the air used to regenerate the catalyst in the reactors; a fan 24 for supplying air under pressure to the heater 23 and the sulphur burner; a pre-heater 25 for heating the sour gas to be treated prior to its entrance into the first group of reactors; a heat exchanger or intercooler 26 for adjusting the temperature of the sour gas prior to its passage through the second oxidation stage of the first group of reactors; a first scrubbing tower 27 for separating the liquid sulphur from the treated gas; a second pre-heater 28 for heating the sour gas after its passage through the first scrubbing tower and prior to its passage through the second group of reactors; a second heat exchanger or intercooler 29 for adjusting the temperature of the sour gas prior to its passage through the second oxidation stage of the second group of reactors; a second scrubbing tower 30 for completing the separation of the elemental liquid sulphur from the treated sour gas; a water scrubbing tower 31 where the water vapor and remaining traces of sulphur vapor in the treated gas are removed; a sulphur cooling and flaking machine 32 where the liquid elemental sulphur is solidified and formed into sulphur flakes; and a storage hopper 33 for storing the flaked sulphur.

There is shown in diagrammatic form in Fig. 3, a reactor arrangement, and particularly a system employing six reactors which have been formed into two groups, with the reactors in each group marked #1, #2, #3, for purposes of identification.

The six reactors are identical in construction and, in general, each comprises a cylindrical chamber in which catalyst in granular form is contained in tubular containers. Each reactor is shown as having an upper manifold 34 connected to an upper multi-damper seat box 35 by a connection fitting or nipple 36, and a lower manifold 37 connected to a lower multi-damper seat box 38 by a connection fitting or nipple 39.

The upper multi-damper seat boxes 35 of reactors #1, #2 and #3 of the first group of reactors are connected to (1) outlet (inlet) damper box fittings a, b and c, respectively, mounted in an upper gas conduit or header 40; (2) outlet (inlet) damper box fittings b, c and a, respectively, mounted in a second upper gas conduit or header 41; and (3) to outlet (inlet) damper box fittings c, a and b, respectively, mounted in an upper hot air conduit or header 42. In like manner, the lower multi-damper seat boxes 38 of reactors #1, #2, and #3 of the first group of reactors are connected to (1) outlet (inlet) damper box fittings a, b and c, respectively, mounted in a lower gas conduit or header 43; (2) outlet (inlet) damper box fittings b, c and a, respectively, mounted in a second lower gas conduit or header 44; and (3) to outlet (inlet) damper box fittings c, a and b, respectively, mounted in a lower hot air conduit or header 45.

The upper gas header 40 is connected at one end to the first pre-heater 25 and has its other end closed. The upper gas header 41 is connected at one end to a heat exchanger 26 and has its other end closed. The upper hot air header 42 is closed at one end and is open to the atmosphere at the other end.

The lower gas header 43 is connected at one end to the heat exchanger 26 and has its other end be a diluent to the gas. If this would be at one end to the first scrubbing tower 27 and has its other end closed. The lower hot air header 45 is closed at one end and has its other end connected to the hot air heater 23. The first scrubbing tower 27 is connected to the second pre-heater 28 by a conduit 46.

The upper multi-damper seat boxes 35 of the reactors #1, #2 and #3 of the second group of reactors are connected to (1) outlet (inlet) damper box fittings $a$, $b$ and $c$, respectively, mounted in an upper gas conduit or header 47; (2) outlet (inlet) damper box fittings $b$, $c$ and $a$, respectively, mounted in a second upper gas conduit or header 48; and (3) to outlet (inlet) damper box fittings $c$, $a$ and $b$, respectively, mounted in an upper hot air conduit or header 49. In like manner, the lower multi-valve damper boxes 38 of the reactors #1, #2 and #3 of the second group of reactors are connected to (1) outlet (inlet) damper box fittings $a$, $b$ and $c$, respectively, mounted in a lower gas conduit or header 50; (2) outlet (inlet) damper box fittings $b$, $c$ and $a$, respectively, mounted in a second lower gas conduit or header 51; and (3) to outlet (inlet) damper box fittings $c$, $a$ and $b$, respectively, mounted in a lower hot air conduit or header 52.

The upper gas header 47 is connected at one end to the second pre-heater 28 and has its other end closed. The upper gas header 48 is connected at one end to the heat exchanger 29 and has its other end closed. The upper hot air header 49 is closed at one end and is open to the atmosphere at the other end. The lower gas header 50 is connected at one end to the heat exchanger 29 and has its other end closed. The lower gas header 51 is connected at one end to the second scrubbing tower 30 and has its other end closed. The lower hot air header 52 is closed at one end and has its other end connected to the hot air heater 23.

Each of the conduits or headers 40, 41, 42, 43, 44, 45, 47, 48, 49, 50, 51 and 52 are made up of pipe sections and outlet (inlet) damper boxes suitably connected together in a manner hereinafter to be described.

While any suitable sulphur liberating gas or oxidant may be used, preferably and illustratively, $SO_2$ is employed and is supplied by the sulphur burner 20.

The sulphur burner 20 and the waste heat boiler 21 may be of any usual suitable type. The burner 20 is shown as having a liquid sulphur supply pipe line 53 connected to supply liquid sulphur to the burner from the second scrubbing tower, and an air supply pipe line 54 connected to the hot air blower 24 for supplying air under pressure to the burner. A conduit or header 55, having valved branched conduits 56, 57, 58 and 59 connected thereto, is connected to the exhaust stack of the sulphur burner for supplying $SO_2$ to the reactors. The valved branch conduits 56 and 57 are connected to the upper gas headers 40 and 41, respectively, of the first group of reactors; the valved branch conduits 58 and 59 are connected to the upper gas headers 47 and 48, respectively, of the second group of reactors.

While the $SO_2$ produced in the sulphur burner would be composed of approximately 19%–20% of $SO_2$, the remainder would be nitrogen. This nitrogen, of course, would remain in the treated gas and be a diluent to the gas. If this would be objectionable, there could be provided a concentrated $SO_2$ by selectively adsorbing the $SO_2$ from the above-mentioned 20% $SO_2$ mixture in a silica gel adsorber or equivalent apparatus and recovering the adsorbed $SO_2$ in concentrated form.

The system shown is designed to provide for continuous operation with two stage oxidation in each group of reactors. This is accomplished in each group by mixing a predetermined amount of gas to be treated with a predetermined proportion of an oxidant or sulphur liberating gas, illustratively $SO_2$, and continuously directing the resultant gas mixture at an optimum pre-reaction temperature into a first selected reactor, for example #1. As the gas mixture comes into intimate contact with the catalyst therein, the 1st oxidation stage takes place and at least a portion of the contained $H_2S$ is oxidized to elemental sulphur vapor with the liberation of heat, mixing a predetermined amount of the treated gas mixture with an additional predetermined proportion of sulphur liberating gas, illustratively $SO_2$, and continuously directing the resultant gas mixture at an optimum pre-reaction temperature through a second selected reactor, for example #3 (2nd oxidation stage). As the gas mixture comes into contact with the catalyst therein, the 2nd oxidation stage takes place and a further portion of the contained $H_2S$ is oxidized to elemental sulphur vapor with the liberation of heat. At the same time, a regenerating medium, such as hot air, is being passed through the third reactor #2 (activation stage). As soon as the catalyst in the reactor forming the first oxidation stage (#1 in the present example) is spent to a predetermined amount, the flow of gas and the regenerating medium through the reactors is shifted, so that the first passage of the gas to be treated is shifted to reactor #3, the last passage of the gas to be treated is shifted to reactor #2, while the flow of the regenerating medium is shifted to reactor #1. As soon as the catalyst in reactor #3 is spent to a predetermined amount, the flow of the gas and the regenerating medium through the reactors is automatically shifted to cause the first passage of the gas to be treated to be through reactor #2, the last passage of the treated gas to be through reactor #1, and the passage of the regenerating medium to be through reactor #3. This cycle of shifting the flow of the gas and the regenerating medium through the reactors in each group is continuous during the operation of the system. Thus, each reactor in succession is last in the oxidation phase (second oxidation stage), is then first in the oxidation phase (first oxidation stage); and finally is on the activating phase. It should be noted that in each group of reactors the last passage of the gas (second oxidation stage) is always through the reactor having the freshest catalyst therein, and the flow of the regenerating medium is always through the reactor having the most spent catalyst therein. At each shift each reactor moves one step or phase in the cycle.

In connection with the foregoing, it will be noted that the arrangement and manner in which the outlet (inlet) damper box fittings $a$, $b$ and $c$ of the headers are connected to the upper and lower multi-damper seat boxes of the reactors in each group of reactors is such that in each step or phase of the cycle all of the dampers of one group bearing the same letter are open, while all of the dampers of the remaining two groups bearing the same letter are closed. In other words, the relation of the dampers in the three phases of each cycle are as follows: first phase, all $a$ dampers are open, all $b$ and $c$ dampers closed; second phase, all $c$ dampers are open, all $a$ and $b$ dampers closed; and, third phase, all $b$ dampers open, all $a$ and $c$ dampers closed. The control mechanism for opening and closing all of the $a$, $b$ and $c$ dampers in accordance with a predetermined time pattern, will hereinafter be described.

The flow of the gas to be treated, the flow of the medium for regenerating the catalyst in the reactors, and the flow of the $SO_2$ will now be described with reference to the reactor arrangement, as shown diagrammatically in Fig. 3. By way of example, it will be assumed that the selective control mechanism for opening and closing the dampers, a, b and c in all of the headers have operated to close all of the b and c dampers and to open all of the a dampers in all of the headers.

The sour gas to be desulphurized is delivered, under suitable pressure of from about 5 to 10 pounds per square inch gauge, from a source of supply (not shown) to the 1st pre-heater 25, by means of a pipe line or conduit 60. The gas is heated in the pre-heater to an optimum pre-reaction temperature and then passes into the upper gas header 40 where it is mixed with a predetermined proportion of sulphur liberating gas or oxidant, illustratively $SO_2$. From the upper gas header 40, the gas mixture passes through outlet damper box a, upper multi-damper seat box 35, and nipple 36 into the upper manifold 34 of reactor #1 of the first group. From the manifold, the gas mixture passes downwardly through the tubular beds of catalyst in the reactor, where it comes into intimate contact with the catalyst and an exothermic reaction takes place in which some elemental sulphur is liberated in vapor form, together with steam, in accordance with the following equation:

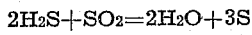

$$2H_2S + SO_2 = 2H_2O + 3S$$

The treated gas passes through the reator into the lower manifold 37 and from the lower manifold through the nipple connection 39, the lower multi-damper seat box 38 into the inlet damper box a of the lower header 43, through which it passes into the first heat exchanger 26, where its temperature, which has risen in the reactor, is again adjusted to an optimum pre-reaction temperature.

From the first heat exchanger 26, the treated gas passes into the upper gas header 41, where it is mixed with an additional predetermined proportion of $SO_2$. From the upper gas header 41, the gas mixture passes through outlet damper box a, upper multi-damper seat box 35, and nipple 36, into the upper manifold 34 of reactor #3 of the first group of reactors. From the upper manifold, the gas mixture passes downwardly through the tubular catalyst beds in the reactor and a reaction similar to that which took place in reactor #1 occurs.

The treated gas passes through the reactor into the lower manifold 37 and from the lower manifold through the nipple connection 39, the lower multi-damper seat box 38 into the inlet damper box a of the lower header 44, through which it passes to the bottom of the first scrubbing tower 27. The treated gas mixture, including the steam and sulphur vapor formed by the reactions in the reactors rises in the scrubbing tower against a downward flow of molten sulphur, which condenses the sulphur vapor into molten sulphur which collects in the bottom of the scrubbing tower.

From the top of the scrubbing tower 27, the partially desulphurized gas passes through a pipe line or conduit 46 into the second pre-heater 28, where its temperature is adjusted to an optimum pre-reaction temperature.

From the second pre-heater 28, the gas passes into the upper header 47, where it is mixed with a predetermined proportion of sulphur liberating gas ($SO_2$). From the upper header 47 the gas mixture passes through outlet damper box a, upper multi-damper seat box 35, and nipple 36, into the upper manifold 34 of reactor #1 of the second group of reactors. From the upper manifold, the gas mixture passes downwardly through the tubular catalyst beds in the reactor and a reaction similar to that which took place in reactor #1 of the first group of reactors occurs. The treated gas passes through the reactor into the lower manifold 37 and from the lower manifold through the nipple connection 39, the lower multi-damper seat box 38 into the inlet damper box a of the lower header 50, through which it passes into the second heat exchanger 29, where its temperature, which has risen in the reactor, is again adjusted to an optimum reaction temperature. From the heat exchanger 29, the gas passes into the second upper gas header 48, where it is mixed with an additional predetermined proportion of $SO_2$. From the header 48, the gas mixture passes through outlet damper box a, upper multi-damper seat box 35, and nipple 36, into the upper manifold 34 of reactor #3 of the second group of reactors.

From the upper manifold, the gas mixture passes downwardly through the tubular catalyst beds in the reactor and a reaction similar to that which took place in reactor #1 of the first group of reactors occurs. The treated gas mixture passes through the reactor into the lower manifold 37 and from the lower manifold passes through the nipple connection 39, the lower multi-damper seat box 38 into the inlet damper box a of the lower header 51, through which it passes into the bottom of the second scrubbing tower 30. The treated gas mixture, from which, in the last two reactors, nearly all of the remaining sulphur has been liberated in the form of elemental sulphur vapor, rises in the scrubbing tower against a downward flow of molten sulphur which condenses the sulphur vapor into molten sulphur, which collects in the bottom of the scrubbing tower. From the top of the scrubbing tower 30, the treated gas passes through pipe line 61 into the bottom of water scrubbing tower 31. The gas rises in the water scrubbing tower 31 against a downwardly flow of water which washes the final remaining traces of sulphur vapor from the gas. From the top of the water scrubbing tower 31, the now sweet gas is passed through a pipe line 62 to its point of use (not shown).

As shown diagrammatically in Fig. 3, $SO_2$ passes from the sulphur burner 20, through header 55 and valved branch conduits 56, 57, 58 and 59 into the upper gas headers 40, 41, 47 and 48, respectively, where it mixes with the gas in the headers and passes with said gas into the reactors. The branch conduits are provided with valves for regulating the amount of $SO_2$ to be admitted into the gas headers, thus permitting the temperature rise in each oxidation stage to be controlled by controlling the supply of $SO_2$ or oxidation gas to such stages.

As shown diagrammatically in Fig. 3, air for use as the regenerating medium is forced into hot air heater 23 by means of a fan or blower 24. The air is heated to a temperature of about 1000° F. in the heater and, from the heater, passes through pipe line or conduit 63 into the lower hot air headers 45 and 52. From the lower hot air header 45, the hot air passes through outlet damper box a, lower multi-damper box seat 38, and nipple connection 39, into the lower manifold 37 of reactor #2 of the first group of reactors.

From the manifold, the hot air passes upward through the tubular catalyst beds in the reactor into the upper manifold 34, the hot air reactivating the catalyst in the beds as it passes through. From the upper manifold 34, the hot air passes through nipple connection 36, upper multi-damper seat box 35, and inlet damper box fitting $a$ into upper hot air header 42 and through the header 42 to the atmosphere.

From the lower hot air header 52, the hot air passes through outlet damper box $a$, lower multi-damper seat box 38 and nipple connection 39 into the lower manifold 37 of reactor #2 of the second group of reactors. From the lower manifold 37, the hot air passes upwardly through the tubular catalyst beds in the reactor into the upper manifold 34, the hot air reactivating the catalyst in the beds as it passes through. From the upper manifold 34, the hot air passes through nipple connection 36, upper multi-damper seat box 35 and inlet damper box fitting $a$ into upper hot air header 49, and through the header 49 to the atmosphere.

While the foregoing description has not been concerned with the utilization of pressurized equipment, this is not a limitation. Some pressure will be required on the system to overcome the back pressure due to friction. Pressure above this limitation is not necessary to successful operation. On the other hand, by allowance for the differential pressure, a reasonable increase in the over-all operating pressures will permit handling larger gas volumes in an apparatus of fixed size.

The present method is contrived to recover a major portion of the contained sulphur in the sour gas in a multi-stage oxidation process without raising the reaction temperature in any stage above about 830° F. by adjusting the temperature of the admixture of the gas to be treated and the sulphur liberating gas, illustratively $SO_2$, to an optimum pre-reaction temperature in the range of from about 375° F. to about 600° F. prior to the entry of the admixture into each of the stages or reaction zones and controlling the amount of $SO_2$ admitted into each stage or reaction zone. However, it is contemplated that substantial portions of the contained sulphur may be removed in the respective stages when employing pre-reaction temperatures up to about 800° F., while controlling the reaction temperatures in the stages so that they do not exceed about 1000° F. in any stage. It will be understood, however, that at higher reaction temperatures than above 830° F. the efficiency of the conversion will be reduced. Therefore, it is highly preferable to practice the method at relatively low reaction temperatures.

As a specific example, assume that the raw gas to be treated contains 125 lbs. of $H_2S$ per 4300 cubic feet at a pressure of 10 lbs. gauge and at 100° F. Then, about 30% of the initial $H_2S$ content of the gas can be converted into sulphur vapor in the first oxidation stage of the first group of reactors by pre-heating the gas to about 500° F. and mixing $SO_2$ with the pre-heated gas at the rate of about 30 lbs. of $SO_2$ per minute prior to the entry of the gas into the reactor in which the first oxidation stage occurs. The temperature in the reactor will rise to from about 720° F. to about 750° F.

About 30% of the initial total $H_2S$ content of the gas can be converted into sulphur vapor in the second oxidation stage of the first group of reactors by cooling the gaseous admixture delivered from the first oxidation stage to about 500° F., then mixing $SO_2$ with the cooled gaseous mixture at the rate of about 30 lbs. of $SO_2$ per minute prior to its entry into the reactor in which the second oxidation stage occurs. The temperature in the reactor will rise to from about 680° F. to about 710° F.

About 30% of the initial total $H_2S$ content of the gas can be converted into sulphur vapor in the first oxidation stage of the second group of reactors by pre-heating the gas after its passage through the first scrubbing tower to about 500° F. and mixing $SO_2$ with the pre-heated gas at the rate of about 30 lbs. of $SO_2$ per minute prior to its entry into the reactor in the second group of reactors in which the first oxidation stage occurs. The temperature in the reactor will rise to from about 670° F. to about 700° F. The remaining 10% of the initial total $H_2S$ content of the gas can be converted into sulphur vapor in the second oxidation stage of the second group of reactors by cooling the gaseous admixture delivered from the first oxidation stage to about 500° F., then mixing $SO_2$ with the cooled gaseous admixture at the rate of about 11 lbs. of $SO_2$ per minute prior to its entry into the reactor of the second group of reactors in which the second oxidation stage occurs. The temperature in the reactor will rise to from about 530° F. to about 560° F.

Obviously, with a raw gas having a much lesser $H_2S$ content it will be possible to remove all of the $H_2S$ in the first group of reactors without raising the temperature in either the first or second oxidation stages above a permissible reaction temperature of from about 747° F. to about 830° F.

It is always advisable, however, to do as much oxidation as possible in the first stage, consistent with the above mentioned reaction temperatures, so that it has been found advisable, when treating a gas containing about 15% $H_2S$, to supply oxidant gases to the various stages so as to accomplish about 55% conversion in the first stage, about 25% in the second stage, about 12% in the third stage, and 8% in the last stage. Since, in the earlier stages, the catalytic conversion can not be completed, the reaction in these stages can be assisted by the presence of an excess of oxidant gas. Thus, to accomplish the illustrative reactions above, it has been found convenient to supply about 75% of the total oxidant gas in the first stage and the remaining 25% in the second stage. The excess not used up in either of these stages is carried with the gas being treated, and is available as needed in the last two stages.

In connection with the foregoing, it may be pointed out that, as the boiling point of sulphur is 832° F., a pure sulphur vapor would condense to liquid if cooled below that temperature. In the present method, as above described, there is no concentrated sulphur at any point. In fact, the maximum concentration is about 2%, at which concentration the sulphur vapor will remain in vapor form at the pressures and temperatures employed in the process.

While it is not a necessary feature of the invention, it may be pointed out that, if the liberated sulphur content of the treated gas becomes too high between the first and second oxidation stages of either group of reactors, all or part of it may be removed. This is readily accomplished, for example, by suitable adjustment of the heat exchangers 26 and 29.

The scrubbing towers 27 and 30 may be of any suitable usual type. In the particular embodiment illustrated, molten sulphur is withdrawn from the bottom of the scrubbing tower 27 through pipe line 64 by pump 65 and delivered to a sulphur cooler 66 through a pipe line 67, see Fig. 1B. From the sulphur cooler 66, the molten sulphur passes through pipe line 68 to the top of the scrubbing tower 27. The molten sulphur cascades downwardly through the scrubbing tower and is brought into intimate contact with the counter-current stream of gas, steam and elemental sulphur vapor rising through the scrubbing tower and condenses the sulphur vapor into molten sulphur which collects in the bottom of the tower. In like manner, molten sulphur is withdrawn from the bottom of the scrubbing tower 30 through a pipe line 69 by a pump 70 and delivered to a sulphur cooler 71 through a pipe line 72, see Fig. 1. From the sulphur cooler 71, the molten sulphur passes through a pipe line 73 to the top of the scrubbing tower 30 and cascades downwardly through the tower in counter-current to the upward flow of gas, steam and sulphur vapor therein and condenses the sulphur vapor which collects in the bottom of the tower. A portion of the molten sulphur being recirculated through the two scrubbing towers, is withdrawn through a pipe line 74, which is connected to a cross pipe line 75 connecting the discharge pipe lines 68 and 73 from the sulphur coolers 66 and 71, and delivered in its molten state to the sulphur cooling and flaking machine 32, where the liquid sulphur is solidified and formed into flakes, in a manner hereinafter to be described.

The water scrubbing tower 31 may be of any suitable usual type. In the particular embodiment illustrated, water is withdrawn from the bottom of the tower 31 through a pipe line 76 by a circulating pump 77, and delivered to a water cooler 78 through pipe line 79. From the water cooler 78, the water passes through pipe line 80 to the top of the tower 31 and is sprayed into the tower. The gas entering the bottom of the tower 31 passes upwardly in the counter-current flow through the water spray. The water spray condenses the water vapor or steam in the gas and removes any traces of sulphur vapor which may be contained therein, leaving the gas sweet to be discharged from the tower through pipe line 62 to its point of use.

The reactors 22 are identical in construction, the details of which are shown in Figs. 4, 5, 6 and 7. As there shown, each reactor comprises a cylindrical tank 81 having a rearwardly and downwardly sloping flat top wall 82 and a rearwardly and upwardly sloping flat bottom wall 83. The top and bottom wall members 82 and 83 are elliptical in outline and are secured, as by bolting, to flange members 84 and 85, respectively, which are secured, as by welding, to the upper and lower peripheries of the cylindrical tank 81. A vertically spaced pair of disc-shaped plates 86, 87 are mounted in the tank 81 with their peripheral edges secured to the wall of the tank, as by welding, to form a gas-tight joint.

The top wall member 82, the upper disc member 86, and the portion of the side wall of the tank therebetween form the upper manifold 34. An opening 88 is formed in the front wall of the upper manifold and the upper flanged connecting fitting or nipple 36 is secured therein, as by welding the inner edges of the rectangular box-like fitting to the edges of the opening 88. The bottom wall member 83, the lower disc member 87, and the portion of the side wall of the tank therebetween form the lower manifold 37. An opening 89 is formed in the front wall of the lower manifold and the lower flanged connecting fitting or nipple 39 is secured therein by welding the inner edges of the rectangular box-like fitting to the edges of the opening 89. The upper disc-shaped member 86 has a plurality of circular openings 90 formed therein, and the lower disc-shaped member 87 has a corresponding number of circular openings 91 formed therein. The openings 90 and 91 in the two disc-shaped members are in vertical alignment, but the openings in the bottom disc-shaped member are of less diameter than the openings in the upper disc-shaped member. A tapered tubular conduit 92, preferably made of sheet metal, extends between each circular opening in the upper disc-shaped member and the corresponding aligned opening in the lower disc-shaped member, with its upper end secured to the peripheral edge of the opening in the upper disc-shaped member and its bottom edge secured to the lower disc-shaped member around the circular openings therein (see Fig. 5).

Figure 9:
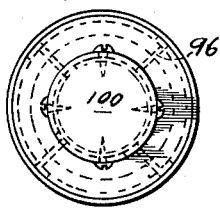
Fig. 9 is a plan view of the tubular container shown in Fig. 8.
Figure 7:
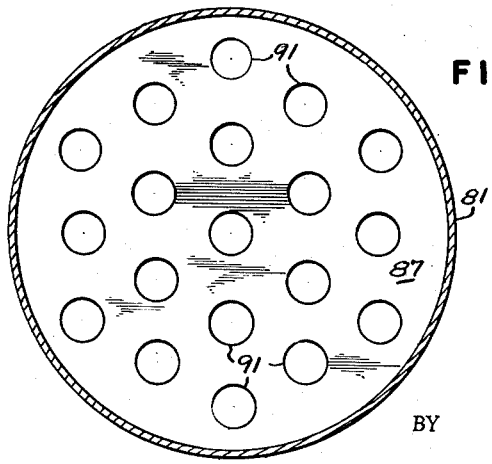
Fig. 7 is a sectional view taken on the line 7—7 of Fig. 4.

Mounted within each of the conduits 92 is a tubular catalyst container 93. The catalyst containers 93 are identical in construction and, as best shown in Figs. 8 and 9, each comprises two concentric tubular screens 94, 95 held in spaced apart relation by a plurality of longitudinal radial fins 96 with the annular space between the screens closed at the bottom, as by a flanged annular plate 97. The mesh of the screens is such as to retain a granular catalyst material 98 in the annular space between the screens. Although the invention is not limited thereto, it is preferred to employ a catalyst wherein granular silica gel, or a substance having substantially the same structure, is the carrier for the active material. Oxides of iron, copper, nickel, aluminum and manganese, or mixtures thereof may be employed as the active material. However, oxides of iron are preferred.

Mounted within the inner wire screen 94 is an inverted substantially conically shaped baffle member 99. The baffle member is closed at its apex which extends downwardly to a point near the bottom of the container and has its upper peripheral edge suitably secured to the upper peripheral edge of the screen. Preferably, the baffle member is made of sheet metal. Each container is closed at its top, as by a cap member 100, connected to ring collars 101 secured to the upper end portions of the wire screens 94, 95.

Figure 5:
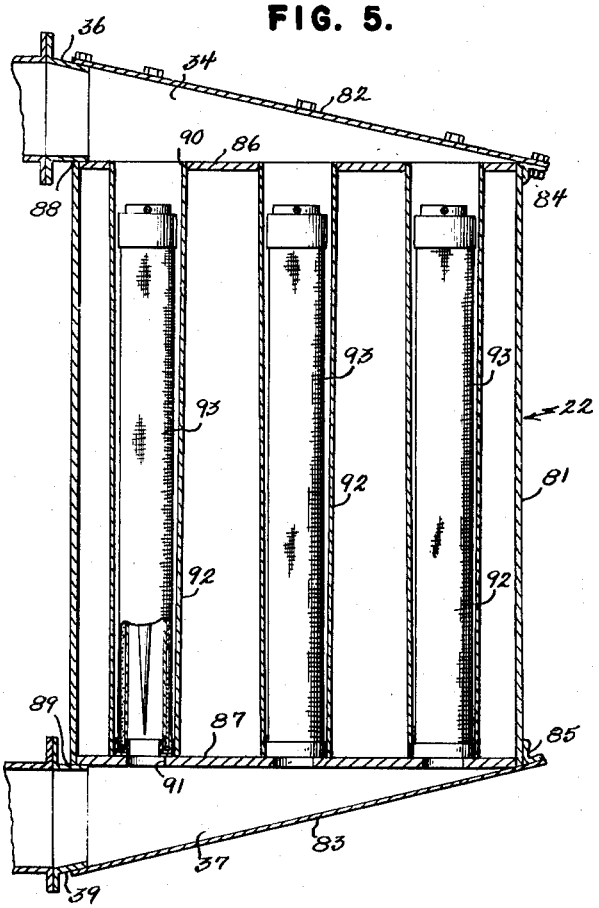
Fig. 5 is a vertical sectional view, with parts omitted, of the reactor shown in Fig. 4.

It should be noted that the annular space between the inner wall of the conduit 92 and the outer wall of the conical-shaped baffle member 99 forms an open ended duct and that the annular bed of catalyst material forms a barrier extending longitudinally across the duct (see Fig. 5).

The diameter of the bases and the taper of the side walls of the members 92 and 99 are such that the cross sectional area of the duct formed between the two members is substantially equal at its top and bottom. The tapers of the side walls of the two members are such that a substantially uniform velocity is obtained on both sides of the barrier as fluid is transferred from the upstream side to the downstream side, regardless of the direction of flow, thereby creating a substantially constant static head over the face of the barrier, resulting in a substantially uniform distribution of the fluid through the entire barrier area. This construction insures a substantially uniform flow of fluid through the silica gel (catalyst material) in the annular containers, whether the flow of fluid is downward, as in the case of the sour gas being treated, or upward, as in the case of the heated activating medium. In connection with the foregoing, it may be pointed out that the annular beds of catalyst material are so thin that they permit velocities of about from 10 to 25 feet per minute through the beds at 60°–70° F. and atmospheric pressure.

The construction and arrangement of the upper headers and lower headers and the manner in which they are connected to the upper and lower multi-damper seat boxes of the reactors in each group is identical and such arrangement for the first group of reactors is shown in Figs. 4, 10 and 11. As there shown, the upper gas header 40 is positioned above the upper multi-damper seat boxes 35 with its outlet (inlet) damper boxes a, b and c connected to the tops of the multi-damper seat boxes 35 of reactors #1, #2 and #3, respectively. The upper header 41 is positioned below the upper multi-damper seat boxes 35 with its outlet (inlet) damper boxes a, b and c connected to the bottom of the multi-damper seat boxes 35 of reactors #3, #1 and #2, respectively (see Fig. 11). The upper hot air header 42 is positioned below the upper head 40 and with its outlet (inlet) damper boxes a, b and c connected to the front side of the multi-damper seat boxes 35, as viewed in Figs. 10 and 11, of reactors #2, #3 and #1, respectively. In like manner, the lower gas header 43 is positioned above the lower multi-valve seat boxes 38 with its outlet (inlet) valve boxes a, b and c connected to the tops of the multi-damper seat boxes 38 of reactors #1, #2 and #3, respectively. The lower gas header 44 is positioned below the lower multi-damper seat boxes 38 with its outlet (inlet) damper boxes a, b and c connected to the bottoms of the multi-damper seat boxes 38 of reactors #3, #1 and #2, respectively (see Figs. 3 and 4). The lower hot air header 45 is positioned below the lower gas header 43 and with its outlet (inlet) damper boxes a, b and c connected to the front side of the multi-damper seat boxes 35, as seen in Fig. 4, of reactors #2, #3 and #1, respectively (see Fig. 3).

All of the outlet (inlet) damper boxes a, b and c in all of the gas headers are identical in construction and all of the outlet (inlet) damper boxes a, b and c in all of the hot air headers are identical in construction. All of the upper and lower multi-damper seat boxes are identical in construction and each is connected to an outlet (inlet) damper box a, or b, or c, of the three upper manifolds or the three lower manifolds, as the case may be, in the same manner.

Figure 12:
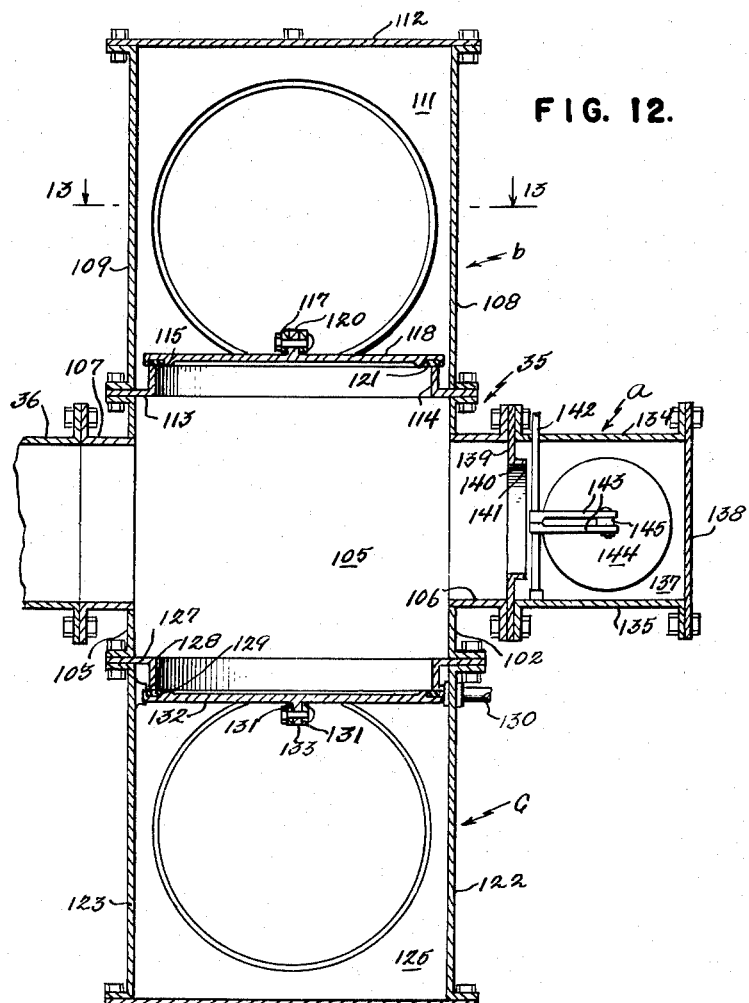
Fig. 12 is a vertical sectional view through the multi-valve seat box fitting connected to #2 reactor of group I, and the outlet (inlet) valve boxes a, b, c connected thereto, taken on the line 12—12 of Fig. 10.
Figure 13:
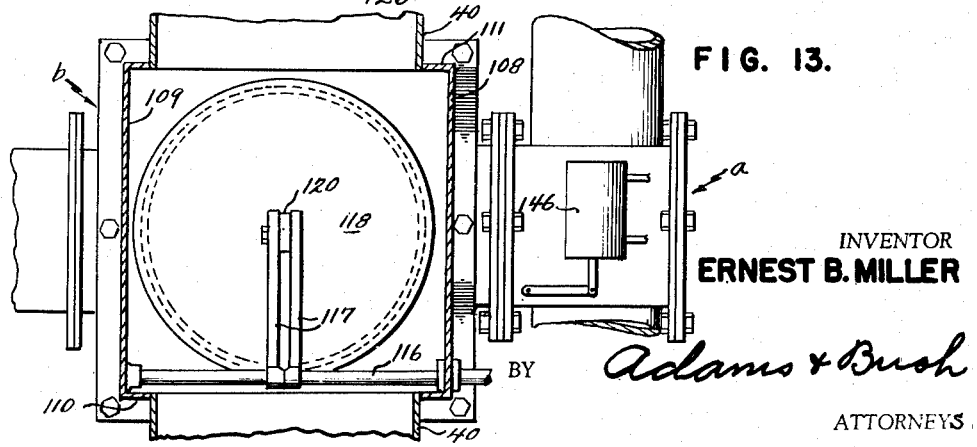
Fig. 13 is a horizontal sectional view taken on the line 13—13 of Fig. 12.

The details of construction of a multi-damper seat box and the construction and arrangement of the three outlet (inlet) damper boxes connected thereto are shown in Figs. 12, 13 and 14. The particular multi-damper seat box shown in these figures is the upper multi-damper seat box of reactor #2 of the first group of reactors, shown in Figs. 10 and 11. As there shown, the multi-damper seat 35 is formed by front and rear wall members 102, 103, and side wall members 104, 105 secured together along their edges to form a hollow rectangular box-like structure open at its top and bottom. The front and rear wall members have integral outwardly extending flanges formed along their top and bottom edges and are provided with rectangular-shaped openings in which the suitably secured, as by welding, flanged box-like nipples 106, 107. The flanged nipple 107 is secured to the flanged nipple 36 of the reactor, as by having their flanges bolted together to form a gas-tight joint. The outlet (inlet) damper box b, which forms a part of upper gas header 40, is formed by front and rear walls 108, 109, side walls 110, 111, and a top wall 112, secured together to form a hollow rectangular box-like structure open at its bottom. The front and rear walls have aligned outwardly extending flanges formed along their top and bottom edges. The top wall 112 is removably secured to the structure, as by bolting. The side wall members have aligned circular openings formed therein and in each are suitably secured the ends of the sections of the conduit 40 (as shown in Figs. 10 and 11).

The outlet (inlet) damper box b is secured to the top of the multi-damper seat box 35, as by bolting the flanged bottom end of the damper box to the flanged upper end of the damper seat box. A rectangular plate 113 is mounted between the damper box b and the damper seat box 35 with its peripheral edge secured between the connected flanges of the two boxes. The plate 113 has a circular opening 114 formed therein and provided with an upstanding peripheral flange forming a circular damper seat 115. An oscillatable shaft 116 extends transversely of the damper box b with one end journalled in a suitable bearing formed on the rear wall 109 and with its other end extending through a bearing bushing in the front wall 108. The shaft 116 has a longitudinally spaced pair of parallel crank arms 117 rigidly secured thereto. A circular damper member 118 is connected to the ends of the crank arms 117 for limited pivotal movement, as by means of an apertured lug 120 bolted between the ends of the crank arms. The damper member 118 is shown as having a circular gasket 121, preferably made of asbestos and positioned to engage the circular damper seat 115 when the damper member 118 is swung to closed position. The construction is such that the shaft 116, when turned in one direction, will swing the damper member 118 onto the damper seat 115 with the circular gasket 121 tightly engaging the end edges of the seat, and, when turned in the opposite direction, will swing the damper member off the damper seat.

The outlet (inlet) damper box c, which forms a part of the upper gas header 41, is identical in construction to the damper box b and is formed by front and rear wall members 122, 123, side wall members 124, 125, and bottom wall member 126, secured together to form a hollow rectangular box-like structure open at its top. The front, rear and side wall members are suitably secured together, as by welding, and have outwardly extending flanges formed around their top and bottom edges. The bottom wall member is removably secured to the structure, as by bolting. The side wall members have aligned circular openings formed therein and in which are suitably secured, as by welding, the ends of the sections of the conduit or head 41 (see Fig. 11).

The outlet (inlet) damper box c is secured to the bottom of the multi-damper seat box 35, as by bolting the flanged top end of the damper box to the flanged bottom end of the multi-damper seat box. A flat rectangular plate 127 is mounted between the damper box c and the multi-damper seat box 35 with its peripheral edges secured between the connected flanges of the two boxes. The plate 127 has a circular opening 128 formed therein and provided with a downwardly projecting peripheral flange forming a circular valve seat 129. An oscillatable shaft 130 extends transversely of the damper box c with one end journalled in a suitable bearing formed on the rear wall of the box and with its other end extending through a bushing bearing in the front wall of the box. The shaft 130 carries a spaced pair of parallel crank arms 131 rigidly secured thereto. A circular damper member 132 is connected to the ends of the crank arms 131 for limited pivotal movement, as by means of an apertured lug 133 bolted between the ends of the crank arms. The construction is such that the shaft 130, when turned in one direction, will swing the damper member 132 into engagement with the damper seat, and when the shaft is turned in the other direction, will swing the damper member off the damper seat. The damper member is also provided with a circular gasket positioned to engage the circular damper seat when the damper member is swung to closed position.

The outlet (inlet) damper box a, which forms a part of the upper hot air header 42, is generally similar in construction to the outlet (inlet) damper boxes b and c, and is formed by top and bottom wall members 134, 135, side wall members 136, 137, and a front wall member 138, secured together to form a hollow, rectangular box-like structure open at its rear. The top, bottom and side wall members are suitably secured together, as by welding, and have integral outwardly extending flanges formed along their front and rear ends. The front wall member is removably secured to the structure, as by bolting. The side wall members have aligned circular openings formed therein and in which are suitably secured, as by welding, the ends of the sections of the conduit or header 42 (see Fig. 11).

The outlet (inlet) damper box a is secured to the front side of the multi-damper seat box 35, as by bolting the flanged rear end of the damper box to the flanged nipple 106 carried by the front wall of the multi-damper seat box. A flat, rectangular plate 139 is mounted between the damper box a and the damper seat box 35 with its peripheral edges secured between the connected flanges of the two boxes. The plate 139 has a circular opening 140 formed therein and provided with an outwardly projecting peripheral flange forming a circular damper seat 141.

A vertical oscillatable shaft 142 is mounted in the damper box a with one end journalled in a suitable bearing formed on the bottom wall of the box and with the other end extending through the top wall. The shaft 142 carries a spaced pair of parallel arms 143 rigidly secured thereto. A circular damper member 144 is connected to the ends of the arms 143 for limited pivotal movement, as by means of an apertured lug 145 bolted between the ends of the arms. The damper member 144 is also provided with a circular gasket and is swung into closed position in engagement with the damper seat 141 when the shaft 142 is turned in one direction, and into open position out of engagement with the damper seat when the shaft 142 is turned in the opposite direction.

From the foregoing, it is apparent that the multi-damper seat box 35, which communicates with the upper manifold of the reactor by means of the nipple 36, may be placed in communication with any selected one of the conduits or heads 40, 41 and 42, by moving the damper member in the damper box of the selected conduit to open position and simultaneously moving the damper members in the other two damper boxes to closed position.

Suitable means are provided for rotating the shafts carrying the damper members. In the particular embodiment of the invention illustrated, each of the damper member shafts is shown as being connected to a reciprocating air motor 146 by means of a system of levers. Each of the motors and the arrangement of levers connecting it to a damper member shaft is identical in construction and, as shown in Fig. 11, the air motor for oscillating the damper shaft in the a damper box of header 40, comprising a cylinder 147, a piston mounted in the cylinder and having a rod 148 pivotally and slidably connected at one end to one end of a lever 149 fixedly attached to the end of the shaft 116 carrying the damper member, and a pair of pipes 150, 151, communicating with the interior of the cylinder for admitting compressed air thereto on each side of the piston. The pipes are connected, one to the head end and the other to the rod end of the cylinder and are connected in a control system hereinafter to be described, and alternately act as inlet and outlet connections to move the piston first in one direction and then in the other direction. The travel of the piston is such as to move the lever through a 90° arc. This permits the damper members to move through a 90° arc in moving from closed to open position, which results in the damper members being held at right angles to the longitudinal axis of the conduits or headers, thereby permitting them to act as baffles to direct the flow of the fluid into the multi-damper seat box.

The apparatus, and the arrangement thereof for selectively opening and closing the dampers in each of the outlet (inlet) damper boxes is generally similar to that shown in my Patent No. 1,872,783, issued August 23, 1932, for Adsorption Systems, and is diagrammatically shown in Fig. 3. As there shown, the head end pipes 150 of all of the air motors operating the damper members in the a outlet (inlet) damper boxes are connected to a distributor pipe 152 and the rod end pipes 151 of all of the air motors operating the damper members in the a outlet (inlet) damper boxes are connected to a distributor pipe 153. In like manner, all of the head end pipes 150 of all of the b air motors are connected to a distributor pipe 154, and all of the rod end pipes 151 of all of the b air motors are connected to a distributor pipe 155, and the head end pipes 150 of all of the c air motors are connected to a distributor pipe 156 and the rod end pipes 151 of all of the c air motors are connected to a distributor pipe 157.

A source of compressed air, including a motor driven compressor (not shown) and a reservoir tank 158, is connected by a pipe 159 to valves 160, 161 and 162, each also lettered a, b and c to indicate their relation to the groups of outlet (inlet) damper box motors which they respectively control. Fig. 14 shows in detail, in section, one of these valves. As shown, it is a conventional D valve of the type used on steam engines, and the pipe 159 supplies the chamber 163 with compressed air which is delivered from the port 164 when the valve is in the position shown, while the port 165 is connected to the exhaust passage 166. The D valve 167 is slidable so that it can open the port 165 to the compressed air and associate the port 164 with the exhaust. The D valve is normally held in the position shown in Fig. 14, by means of a spring 168 acting on its stem. The stem extends, as at 169, through the other end of the casing and is connected by means of a centrally pivoted lever 170 to a roller 171 operating on a cam 172. In Fig. 3, three cams are shown on a common shaft 173, each cam having a lobe of substantially 120° extent and each lobe radially spaced from the preceding lobe by 120°. This provides that but one of the valves 160, 161, 162 is open against its spring at any one time and in Fig. 3, the upper valve 160 controlling the *a* dampers of the reactors is shown open to permit air to be delivered to the rod ends of the cylinders 146 through the distributor pipe 153, which causes the opening of the damper members in all of the *a* outlet (inlet) damper boxes. The remaining valves 161, 162 are so held by their springs that the *b* and *c* damper members of the reactors are closed, due to air being delivered to the head ends of the cylinders 146 through distributor pipes 154 and 156, respectively, thereby holding the damper members in all of the *b* and *c* outlet (inlet) damper boxes in closed position.

The shaft 173 is driven by any suitable timing mechanism 174 which will turn it a third of a revolution at definite intervals, preferably timed by the average length of time necessary to deactivate a reactor, since activation can be performed in this time or less, if necessary.

The arrangement of the reactors so that oxidation takes place in stages, is of particular advantage in that is (1) permits more efficient use of the catalyst; (2) provides for controlling the temperature of reaction by the heat exchangers between the stages; and (3) the nearly complete removal of all traces of sulphur, due to the partially reacted gas from the 1st oxidation stage being passed through a reactor which has just been activated for the 2nd oxidation stage in each group of reactors.

The details of construction of the sulphur flaking machine 32 are shown in Figs. 15 to 25, inclusive. As there shown, a vertical rotatable open ended cylindrical member 175 having a plurality of axially spaced annular plates 176 secured thereto is mounted within a suitable structural frame, indicated generally at 177. The structural frame is formed of structural steel members and is shown as including four vertical frame members 178 having their upper end portions bent over the top of the drum and secured to a plate carrying an upper vertical guide bearing 179 for a vertical shaft 180 extending centrally of the cylinder 175 and having a lower step bearing 181 mounted on a concrete foundation block 182. Upper and lower radial arms 183 connect the shaft to the cylinder. The structural frame 177 also includes four vertical frame members 184 and three vertically spaced horizontal bracing frames 185, each formed by four structural channel members 186 having their ends secured to the vertical frame members 184, and having an angle brace 187 extending across each corner (see Fig. 16).

The diameters of the circular opening in the annular plates 176 are larger than the diameter of the cylinder 175 and the inner peripheral edge portions of the plates are secured to the cylinder, as by a plurality of circumferentially spaced L-shaped members 188 having their legs suitably secured to the cylinder and the respective plates (see Figs. 18 and 21). The outer peripheral edge portions of the annular plates are supported by a plurality of roller assemblies 189 carried by four vertical frame members 190 each of which is secured to the three vertically spaced angle braces 187 in each corner of the structural frame assembly and by the vertical frame members 178 (see Fig. 16).

Figure 17:
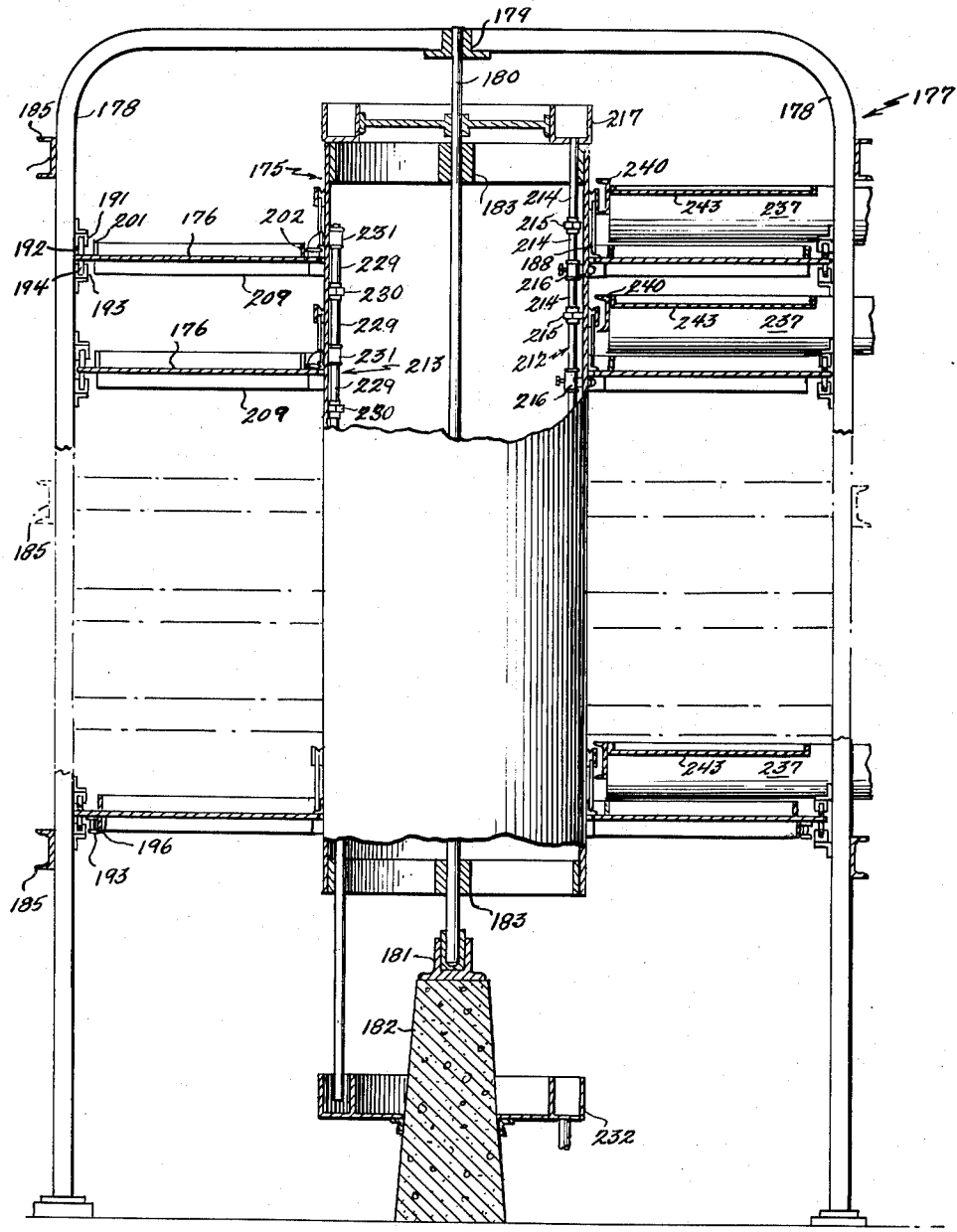
Fig. 17 is an elevational view, partly in section, and with parts omitted for clarity, of the machine shown in Fig. 15.

Each of the roller assemblies is identical in construction and, as best seen in Fig. 17, comprises an upper inverted U-shaped member 191 having a roller 192 journalled therein and a lower U-shaped member 193 having a roller 194 journalled therein. The members 191 and 193 are secured to the respective frame member on which they are mounted in spaced apart relation, as by means of brackets which may be welded or bolted to the frame member.

Figure 23:
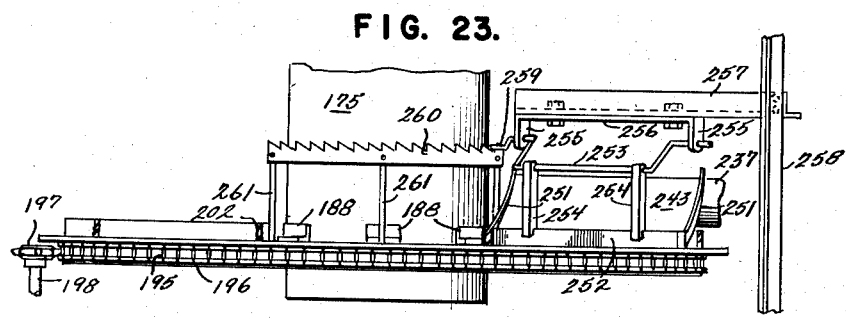
Fig. 23 is an elevational detail view showing the manner in which a breaker is mounted.
Figure 24:
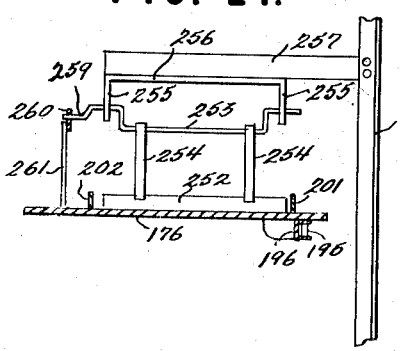
Fig. 24 is an elevational detail view showing the breaker bar.
Figure 25:
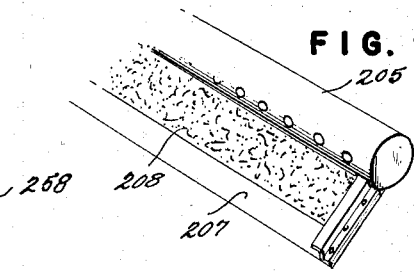
Fig. 25 is a fragmentary perspective detail view showing the construction of a water spray pipe.

Rotation of the cylinder and the annular plates is effected as by means of a sprocket chain 195 carried by a depending ring member 196 secured to the bottom outer edge of the bottom plate 176 (see Figs. 23 and 24). The sprocket chain meshes with a sprocket 197 mounted on the upper end of a shaft 198 driven by a motor 199 through suitable reduction gear 200 (see Figs. 15 and 23).

Each of the annular plates 176 is provided with an upstanding annular flange 201 adjacent its outer periphery and an upstanding annular flange 202 adjacent its inner periphery (see Figs. 17 and 24). The surfaces of the plates between the inner and outer upstanding flanges are designed to have liquid sulphur deposited thereon, as the plates are rotated, by means of a plurality of perforated horizontally extending branch conduits 203 connected to a vertically extending header conduit 204 which is connected to the pipe line 74 which delivers liquid sulphur from the scrubbing tower, as above described (see Figs. 15 and 16). All of the liquid sulphur pipe lines and conduits may be steam jacketed, if desired.

In order to prevent the liquid sulphur from sticking to the plates, a plurality of horizontally extending perforated branch water conduits 205 are provided. Each of the branch conduits extends across one of the plates 176 and is positioned ahead of the branch conduit 203 which deposits liquid sulphur on the plate, so that a water film may be deposited on the plate as it rotates before the sulphur is deposited. The branch water conduits are connected to a water header 206 which is connected to a source of water supply (not shown), see Figs. 15 and 16. In order to insure that a continuous thin film of water is deposited on the plates 176 and to prevent any possible flow of liquid sulphur to pass back of the perforated branch water conduits 205, each of the conduits 205 is shown as having secured thereto a downwardly and forwardly extending generally rectangular metal lip 207 having a felt pad 208 suitably secured to the upper portion of its surface just below the row of perforations in the pipe (see Fig. 25).

While the thin layers of deposited liquid sulphur may be solidified by air cooling, additional means for cooling the sulphur may be provided. In the particular embodiment of the invention illustrated, additional cooling means are provided by water jacketing the bottoms of the portions of the plates 176 on which the sulphur is deposited. Each of the plates 176 is water jacketed in the same manner and, as shown, a plurality of pans 209 (see Figs. 15, 17, 18, 19) are secured to the under surfaces of the plates. Each pan is substantially trapezoidal in shape and its upstanding walls are provided with a laterally extending flange around their upper edges. The pans are removably secured to the under sides of the plates 176 as by means of radially extending steel strips 210 bolted to the under surfaces of the plates and securing the flanges of adjacent plates between itself and the plates. Cork gaskets may be inserted between the flanges and the steel plates if desired (see Fig. 20). The flanges along the inner and outer walls of the pans are secured to the under side of the plates 176, as by bolting, with an intervening gasket strip 211 to make it water-tight (see Figs. 21 and 22).

Mounted within the cylinder 175 are a plurality of water inlet pipes 212 and water outlet pipes 213. Each of the inlet pipes 212 is made up of a series of short pipe sections 214, union couplings 215, and valved T fittings 216 connected together so that each valved T fitting is positioned to be connected to one of the pans of the series of pans under each of the annular plates 176, and the union couplings are positioned on opposite sides of the valved T fittings to facilitate the connection or disconnection of the T fitting to its respective pan (see Fig. 17). Each of the inlet pipes 212 is fixedly connected at its upper end to a compartment in an annular compartmentized open-top trough 217 which is secured to the shaft 180 and rotates with the cylinder 175. Water is supplied to the compartmentized trough 217 by means of a plurality of arcuate perforated pipes 218 (four being shown), each of which is positioned to supply water to a series of compartments in the trough (see Fig. 15). Each arcuate pipe 218 is connected to a valved down comer pipe 219. The down comer pipes 219 are connected to a single down comer pipe 220 carried by a pipe 221 which is connected to the source of water supply (not shown). The construction and arrangement are such that each separate series or group of compartments in the trough 217 will have a separate controlled water supply, thus permitting control of the rate of flow of the water through the pipes 212 and thereby permitting control of the temperature of the cooling pans.

The manner in which each water inlet pipe 212 is connected to each of its respective pans is identical and the details thereof are shown in Fig. 21. As there shown, the valved T fitting 216 has its stem or lateral branch 222 projecting through an opening formed in the cylinder 175 and connected to a spur tube 223 in the pan as by means of a nipple 224 and a coupling 225, respectively. A gasket may be positioned between the coupling and the wall of the pan and a lock nut may be threaded on the spur tube, if desired, all as shown in Fig. 21. The inner peripheral edge of the T fitting stem forms a seat for a valve disc 226 mounted on the end of a threaded valve stem 227 screwed in a cap or plug member 228, which, in turn, is screwed in the side wall of the T fitting opposite the stem branch. The flow of water into the pan may be controlled by adjusting the valve disc relative to its seat.

Figure 15:
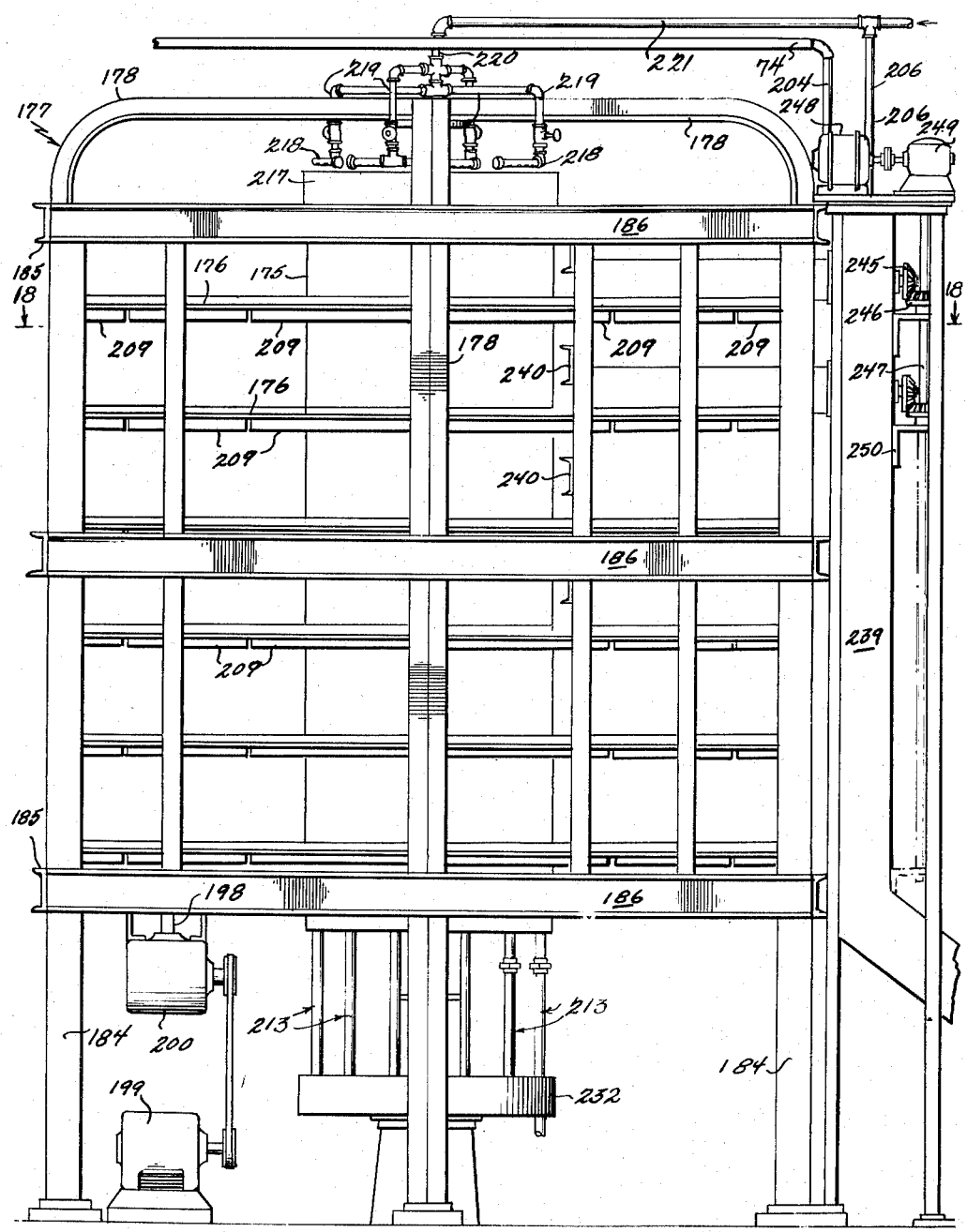
Fig. 15 is an elevational view, with parts omitted, of the sulphur flaking machine.
Figure 16:
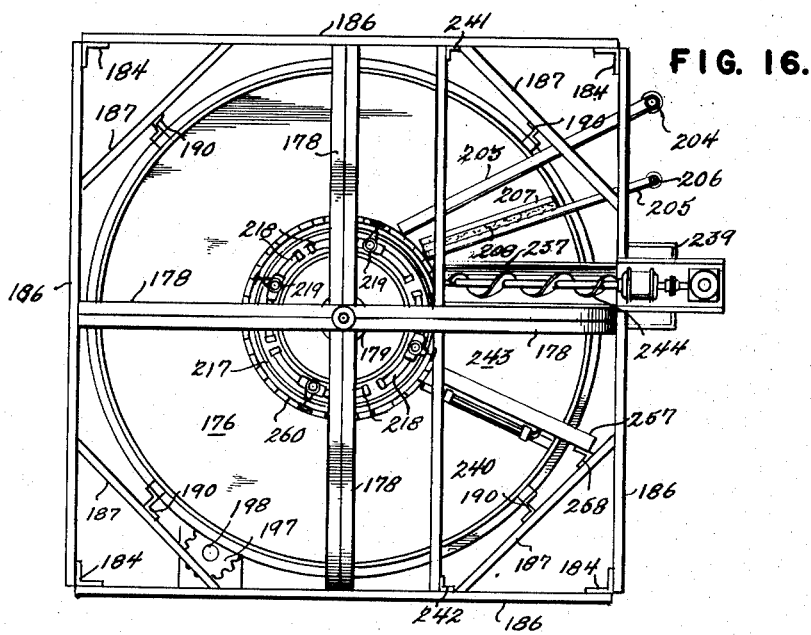
Fig. 16 is a plan view of the machine shown in Fig. 15.

Each of the outlet pipes 213 is made up of a series of short pipe sections 229, union couplings 230, and T fittings 231 connected together so that each T fitting is positioned to be connected to one of the pans of the series of pans under each of the annular plates 176 and the union couplings are positioned on opposite sides of the T fittings to facilitate the connection or disconnection of the T fitting to its respective pan (see Fig. 17). Each of the outlet pipes 213 has its bottom pipe section projecting downwardly into an open top annular trough 232 fixedly mounted on the concrete support 182. The annular trough 232 may be provided with a drain pipe and a plurality of the bottom pipe sections of the outlet pipes 213 may be provided with couplings to facilitate their removal to permit access to the interior of the drum 175, all as shown in Fig. 15.

The manner in which each water outlet pipe 213 is connected to each of the respective pans is identical and the details thereof are shown in Fig. 22. As there shown, the T fitting 231 has its stem or lateral branch 233 projecting through an opening formed in the cylinder 175 and connected to an elbow fitting 234 by means of a nipple 235. The elbow fitting 234 is connected to a nipple 236 which extends through a disc flange bolted into the upper surface of the plate 176 adjacent its inner edge, and is threaded into an opening formed in the plate 176, all as shown in Fig. 22.

Suitable means are provided for scooping up the deposited layers of sulphur on the annular plates 176 after they have solidified. In the particular embodiment of the invention illustrated, such means are shown as comprising a plurality of trough 237 each having its open outer end 238 connected to discharge into a vertical chute 239 and its closed inner end secured to a channel bar 240 which extends between and is secured at its ends to upright angle frame members 241, 242 (see Figs. 15 and 16). Each of the troughs 237 is positioned to extend inwardly over one of the annular plates 176 and each has a ramp 243 extending downwardly into engagement with the upper surface of the plate and positioned to scoop the sulphur into the trough, and a screw conveyor 244 having its inner end journaled in a suitable bearing formed on the closed inner end of the trough and its outer end portion journaled in a suitable bearing formed in the outer side wall of the vertical chute 239 and carrying a beveled gear 245 which meshes with a beveled gear 246 fixedly mounted on a vertical shaft 247. The vertical shaft 247 drives all of the screw conveyors and, in turn, is driven, as by means of a motor 248, through reduction gearing 249. The vertical shaft 247 may be mounted in vertically spaced bracket bearings 250 suitably secured to the outside wall of the chute 239 (see Figs. 15, 16 and 18). The ramp or scoop 243 is provided with upright flanges along its longitudinal side edges and fits between the outer and inner flanges on the plate 176 (see Fig. 23).

Suitable means are provided for breaking up the solidified layer of sulphur on each of the plates 176 before it is scooped up into the trough associated with the plate. Each of these means is identical in construction and the details thereof are shown in Figs. 23 and 24. As there shown, a heavy breaker bar 252 is pivotally suspended from a U-shaped crank shaft 253, as by means of a spaced pair of arms 254. The crank shaft 253 is journalled in the depending legs 255 of an inverted U-shaped bracket member 256. The member 256 is secured to a bracket arm 257 connected at one end to an upright structural angle member 258 which, in turn, is secured to the tiered cross brace members 187 in one corner of the structural frame (see Fig. 16). The arm 257 extends across the plate 176 in position to place the breaker bar 252 adjacent the bottom of the ramp or scoop 243 (see Figs. 16 and 23). The inner end of the crank shaft 253, as viewed in Figs. 23 and 24, has a crank 259 formed thereon and positioned associate the port 164 with the exhaust. The D valve is normally held in the position shown in Fig. 14, by means of a spring 168 acting on its stem. The stem extends, as at 169, through the other end of the casing and is connected by means of a centrally pivoted lever 170 to a roller 171 operating on a cam 172. In Fig. 3, three cams are shown on a common shaft 173, each cam having a lobe of substantially 120° extent and each lobe radially spaced from the preceding lobe by 120°. This provides that but one of the valves 160, 161, 162 is open against its spring at any one time and in Fig. 3, the upper valve 160 controlling the $a$ dampers of the reactors is shown open to permit air to be delivered to the rod ends of the cylinders 146 through the distributor pipe 153, which causes the opening of the damper members in all of the $a$ outlet (inlet) damper boxes. The remaining valves 161, 162 are so held by their springs that the $b$ and $c$ damper members of the reactors are closed, due to air being delivered to the head ends of the cylinders 146 through distributor pipes 154 and 156, respectively, thereby holding the damper members in all of the $b$ and $c$ outlet (inlet) damper boxes in closed position.

The shaft 173 is driven by any suitable timing mechanism 174 which will turn it a third of a revolution at definite intervals, preferably timed by the average length of time necessary to deactivate a reactor, since activation can be performed in this time or less, if necessary.

The arrangement of the reactors so that oxidation takes place in stages, is of particular advantage in that is (1) permits more efficient use of the catalyst; (2) provides for controlling the temperature of reaction by the heat exchangers between the stages; and (3) the nearly complete removal of all traces of sulphur, due to the partially reacted gas from the 1st oxidation stage being passed through a reactor which has just been activated for the 2nd oxidation stage in each group of reactors.

The details of construction of the sulphur flaking machine 32 are shown in Figs. 15 to 25, inclusive. As there shown, a vertical rotatable open ended cylindrical member 175 having a plurality of axially spaced annular plates 176 secured thereto is mounted within a suitable structural frame, indicated generally at 177. The structural frame is formed of structural steel members and is shown as including four vertical frame members 178 having their upper end portions bent over the top of the drum and secured to a plate carrying an upper vertical guide bearing 179 for a vertical shaft 180 extending centrally of the cylinder 175 and having a lower step bearing 181 mounted on a concrete foundation block 182. Upper and lower radial arms 183 connect the shaft to the cylinder. The structural frame 177 also includes four vertical frame members 184 and three vertically spaced horizontal bracing frames 185, each formed by four structural channel members 186 having their ends secured to the vertical frame members 184, and having an angle brace 187 extending across each corner (see Fig. 16).

The diameters of the circular opening in the annular plates 176 are larger than the diameter of the cylinder 175 and the inner peripheral edge portions of the plates are secured to the cylinder, as by a plurality of circumferentially spaced L-shaped members 188 having their legs suitably secured to the cylinder and the respective plates (see Figs. 18 and 21). The outer peripheral edge portions of the annular plates are supported by a plurality of roller assemblies 189 carried by four vertical frame members 190 each of which is secured to the three vertically spaced angle braces 187 in each corner of the structural frame assembly and by the vertical frame members 178 (see Fig. 16).

Each of the roller assemblies is identical in construction and, as best seen in Fig. 17, comprises an upper inverted U-shaped member 191 having a roller 192 journalled therein and a lower U-shaped member 193 having a roller 194 journalled therein. The members 191 and 193 are secured to the respective frame member on which they are mounted in spaced apart relation, as by means of brackets which may be welded or bolted to the frame member.

Rotation of the cylinder and the annular plates is effected as by means of a sprocket chain 195 carried by a depending ring member 196 secured to the bottom outer edge of the bottom plate 176 (see Figs. 23 and 24). The sprocket chain meshes with a sprocket 197 mounted on the upper end of a shaft 198 driven by a motor 199 through suitable reduction gear 200 (see Figs. 15 and 23).

Each of the annular plates 176 is provided with an upstanding annular flange 201 adjacent its outer periphery and an upstanding annular flange 202 adjacent its inner periphery (see Figs. 17 and 24). The surfaces of the plates between the inner and outer upstanding flanges are designed to have liquid sulphur deposited thereon, as the plates are rotated, by means of a plurality of perforated horizontally extending branch conduits 203 connected to a vertically extending header conduit 204 which is connected to the pipe line 74 which delivers liquid sulphur from the scrubbing tower, as above described (see Figs. 15 and 16). All of the liquid sulphur pipe lines and conduits may be steam jacketed, if desired.

In order to prevent the liquid sulphur from sticking to the plates, a plurality of horizontally extending perforated branch water conduits 205 are provided. Each of the branch conduits extends across one of the plates 176 and is positioned ahead of the branch conduit 203 which deposits liquid sulphur on the plate, so that a water film may be deposited on the plate as it rotates before the sulphur is deposited. The branch water conduits are connected to a water header 206 which is connected to a source of water supply (not shown), see Figs. 15 and 16. In order to insure that a continuous thin film of water is deposited on the plates 176 and to prevent any possible flow of liquid sulphur to pass back of the perforated branch water conduits 205, each of the conduits 205 is shown as having secured thereto a downwardly and forwardly extending generally rectangular metal lip 207 having a felt pad 208 suitably secured to the upper portion of its surface just below the row of perforations in the pipe (see Fig. 25).

While the thin layers of deposited liquid sulphur may be solidified by air cooling, additional means for cooling the sulphur may be provided. In the particular embodiment of the invention illustrated, additional cooling means are provided by water jacketing the bottoms of the portions of the plates 176 on which the sulphur is deposited. Each of the plates 176 is water jacketed in the same manner and, as shown, a plurality of pans 209 (see Figs. 15, 17, 18, 19) are secured to the under surfaces of the plates. Each pan is substantially trapezoidal in shape and its upstanding walls are provided with a laterally extending flange around their upper edges. The pans are removably secured to the under sides of the plates 176 as by means of radially extending steel strips 210 bolted to the under surfaces of the plates and securing the flanges of adjacent plates between itself and the plates. Cork gaskets may be inserted between the flanges and the steel plates if desired (see Fig. 20). The flanges along the inner and outer walls of the pans are secured to the under side of the plates 176, as by bolting, with an intervening gasket strip 211 to make it water-tight (see Figs. 21 and 22).

Mounted within the cylinder 175 are a plurality of water inlet pipes 212 and water outlet pipes 213. Each of the inlet pipes 212 is made up of a series of short pipe sections 214, union couplings 215, and valved T fittings 216 connected together so that each valved T fitting is positioned to be connected to one of the pans of the series of pans under each of the annular plates 176, and the union couplings are positioned on opposite sides of the valved T fittings to facilitate the connection or disconnection of the T fitting to its respective pan (see Fig. 17). Each of the inlet pipes 212 is fixedly connected at its upper end to a compartment in an annular compartmentized open-top trough 217 which is secured to the shaft 180 and rotates with the cylinder 175. Water is supplied to the compartmentized trough 217 by means of a plurality of arcuate perforated pipes 218 (four being shown), each of which is positioned to supply water to a series of compartments in the trough (see Fig. 15). Each arcuate pipe 218 is connected to a valved down comer pipe 219. The down comer pipes 219 are connected to a single down comer pipe 220 carried by a pipe 221 which is connected to the source of water supply (not shown). The construction and arrangement are such that each separate series or group of compartments in the trough 217 will have a separate controlled water supply, thus permitting control of the rate of flow of the water through the pipes 212 and thereby permitting control of the temperature of the cooling pans.

The manner in which each water inlet pipe 212 is connected to each of its respective pans is identical and the details thereof are shown in Fig. 21. As there shown, the valved T fitting 216 has its stem or lateral branch 222 projecting through an opening formed in the cylinder 175 and connected to a spur tube 223 in the pan as by means of a nipple 224 and a coupling 225, respectively. A gasket may be positioned between the coupling and the wall of the pan and a lock nut may be threaded on the spur tube, if desired, all as shown in Fig. 21. The inner peripheral edge of the T fitting stem forms a seat for a valve disc 226 mounted on the end of a threaded valve stem 227 screwed in a cap or plug member 228, which, in turn, is screwed in the side wall of the T fitting opposite the stem branch. The flow of water into the pan may be controlled by adjusting the valve disc relative to its seat.

Each of the outlet pipes 213 is made up of a series of short pipe sections 229, union couplings 230, and T fittings 231 connected together so that each T fitting is positioned to be connected to one of the pans of the series of pans under each of the annular plates 176 and the union couplings are positioned on opposite sides of the T fittings to facilitate the connection or disconnection of the T fitting to its respective pan (see Fig. 17). Each of the outlet pipes 213 has its bottom pipe section projecting downwardly into an open top annular trough 232 fixedly mounted on the concrete support 182. The annular trough 232 may be provided with a drain pipe and a plurality of the bottom pipe sections of the outlet pipes 213 may be provided with couplings to facilitate their removal to permit access to the interior of the drum 175, all as shown in Fig. 15.

The manner in which each water outlet pipe 213 is connected to each of the respective pans is identical and the details thereof are shown in Fig. 22. As there shown, the T fitting 231 has its stem or lateral branch 233 projecting through an opening formed in the cylinder 175 and connected to an elbow fitting 234 by means of a nipple 235. The elbow fitting 234 is connected to a nipple 236 which extends through a disc flange bolted into the upper surface of the plate 176 adjacent its inner edge, and is threaded into an opening formed in the plate 176, all as shown in Fig. 22.

Suitable means are provided for scooping up the deposited layers of sulphur on the annular plates 176 after they have solidified. In the particular embodiment of the invention illustrated, such means are shown as comprising a plurality of trough 237 each having its open outer end 238 connected to discharge into a vertical chute 239 and its closed inner end secured to a channel bar 240 which extends between and is secured at its ends to upright angle frame members 241, 242 (see Figs. 15 and 16). Each of the troughs 237 is positioned to extend inwardly over one of the annular plates 176 and each has a ramp 243 extending downwardly into engagement with the upper surface of the plate and positioned to scoop the sulphur into the trough, and a screw conveyor 244 having its inner end journaled in a suitable bearing formed on the closed inner end of the trough and its outer end portion journaled in a suitable bearing formed in the outer side wall of the vertical chute 239 and carrying a beveled gear 245 which meshes with a beveled gear 246 fixedly mounted on a vertical shaft 247. The vertical shaft 247 drives all of the screw conveyors and, in turn, is driven, as by means of a motor 248, through reduction gearing 249. The vertical shaft 247 may be mounted in vertically spaced bracket bearings 250 suitably secured to the outside wall of the chute 239 (see Figs. 15, 16 and 18). The ramp or scoop 243 is provided with upright flanges along its longitudinal side edges and fits between the outer and inner flanges on the plate 176 (see Fig. 23).

Suitable means are provided for breaking up the solidified layer of sulphur on each of the plates 176 before it is scooped up into the trough associated with the plate. Each of these means is identical in construction and the details thereof are shown in Figs. 23 and 24. As there shown, a heavy breaker bar 252 is pivotally suspended from a U-shaped crank shaft 253, as by means of a spaced pair of arms 254. The crank shaft 253 is journalled in the depending legs 255 of an inverted U-shaped bracket member 256. The member 256 is secured to a bracket arm 257 connected at one end to an upright structural angle member 258 which, in turn, is secured to the tiered cross brace members 187 in one corner of the structural frame (see Fig. 16). The arm 257 extends across the plate 176 in position to place the breaker bar 252 adjacent the bottom of the ramp or scoop 243 (see Figs. 16 and 23). The inner end of the crank shaft 253, as viewed in Figs. 23 and 24, has a crank 259 formed thereon and positioned to extend across and be engaged by the teeth of a rotating ratchet or cam ring 260. The ratchet or cam ring is shown as encircling the cylinder 175 and as being mounted on a plurality of circumferentially spaced vertical rods 261 secured to the inner end portion of the plate 176 (see Figs. 23 and 24). The inclined upper surfaces of the teeth of the ratchet ring engage the crank 259 on the end of crank shaft 253 as the ratchet ring rotates and causes an alternate rising and falling of the breaker bar 252, which results in breaking the solidified sulphur into small pieces or flakes before it passes up the ramp or scoop 243 into the trough 237.

The operation of the device is believed obvious. As the cylinder 175 and the annular plates 176 are rotated (in a counter-clockwise direction as viewed in Fig. 16), a thin film of water is deposited on the upper surface of each of the plates 176 by the branch water pipes 205 and a layer of liquid sulphur is deposited on top of the film of water by the branch sulphur pipes 203. The thickness of the layer of sulphur is determined by the speed of rotation of the plates and the rate of flow of the liquid sulphur. As the plates rotate, the layers of liquid sulphur thereon are solidified by the air and by the water jackets beneath the plates. As the solidified layers of sulphur approach the ramps or scoops 243, they are broken into small pieces or flakes by the constant rising and falling of the breaker bar 252. The broken pieces or flakes of sulphur pass up the ramps into the troughs 237 from which they are removed by the screw conveyors and dumped into the vertical chute 239. The sulphur flakes fall through the chute 239 into the bottom of a vertical conveyor 261 which lifts them into the storage hopper 33 (see Fig. 1). The sulphur flaking machine may be made of any suitable material, such as structural steel. However, all the parts thereof which come into contact with the liquid sulphur are preferably made of stainless steel.

From the foregoing description, it will be apparent that the improved system and process are applicable to the continuous recovery of elemental sulphur from gases containing $H_2S$ particularly sour gas delivered from oil wells and prepared to be pumped through pipes to points of use. Likewise, the invention provides for the continuous conversion of the recovered sulphur into flake form for easy handling.

From the foregoing, it readily will be seen that there has been provided a novel method of and improved apparatus for recovering elemental sulphur in liquid form from gases containing $H_2S$ and converting the recovered liquid sulphur into sulphur flakes which provides for carrying out the reaction process in at least two oxidation stages with control of the temperature rise in each stage, thereby permitting the reaction process to be effected at temperature below about 800° F. with resulting increase in efficiency of the process, use of less expensive apparatus, and permitting the use of a catalyst carrier such as silica gel.

Obviously, the present invention is not restricted to the particular embodiment thereof herein shown and described. Moreover, it is not indispensible that all the features of the invention be used conjointly, since they may be employed advantageously in various combinations and sub-combinations.

What is claimed is:

1. In the recovery of elemental sulphur in liquid form from gases containing $H_2S$ involving the contact of a catalyst with the gas containing $H_2S$ to form sulphur vapor and the subsequent condensation of the sulphur vapor to form liquid sulphur, the improvement which comprises maintaining at least one bed of catalyst in each of two zones; mixing a predetermined amount of the gas to be treated with a predetermined proportion of sulphur liberating gas and continuously directing a flow of the mixed gases at an optimum pre-reaction temperature through one of said zones, so that the $H_2S$ in said zone will be converted into sulphur vapor and steam; continuously directing the flow of a hot oxidizing medium through the other of said zones to reactivate the catalyst therein; periodically shifting the flows of the mixture of $H_2S$ containing gas and oxidant gas and the oxidizing medium through said zones, so that each zone becomes, in succession, a reaction zone and a reactivating zone; continuously withdrawing the reacted gaseous mixture from the zone in which reaction is taking place and directing its flow through a condensing zone; and there condensing the sulphur vapor to form liquid sulphur.

2. The method, as set forth in claim 1, wherein the oxidant gas is $SO_2$ and wherein a portion of the liquid sulphur from the condensing zone is continuously withdrawn and burned to supply the $SO_2$.

3. In the recovery of elemental sulphur in liquid form from gases containing $H_2S$ involving the contact of a catalyst with the gas containing $H_2S$ to form sulphur vapor and the subsequent condensation of the sulphur vapor to form liquid sulphur, the improvement which comprises maintaining at least one bed of catalyst in each of a plurality of zones; continuously directing the flow of a hot oxidizing medium through one of said zones to reactivate the catalyst therein; continuously directing the flow of the $H_2S$ containing gas in succession and in series through the remainder of said zones; subjecting the $H_2S$ containing gas to heat exchange to bring its temperature to an optimum reaction temperature and mixing a predetermined amount of oxidant gas with it prior to its passage through each zone to convert a portion of the $H_2S$ in each zone into sulphur vapor and steam; periodically shifting the flows of the mixture of $H_2S$ gas and oxidant gas and the oxidizing medium through said zones, so that each zone becomes, in succession, a reactivating zone while the remaining zones are reaction zones; continuously withdrawing the reacted gaseous mixture from the last zone in which reaction is taking place and directing its flow through a condensing zone and there condensing the sulphur vapor to form liquid sulphur.

4. In the recovery of elemental sulphur in liquid form from gases containing $H_2S$ involving the contact of a catalyst with the gas containing $H_2S$ to form sulphur vapor and the subsequent treatment of the catalyst in an oxidizing atmosphere to regenerate the catalyst for further contact with the gases containing $H_2S$ and the subsequent condensation of the sulphur vapor to form liquid sulphur, the improvement which comprises maintaining at least one bed of catalyst in each of a plurality of zones; continuously directing the flow of a hot oxidizing medium through one of said zones to reactivate the catalyst therein; continuously directing the flow of the $H_2S$ containing gas in succession and in series through the remainder of said zones; subjecting the $H_2S$ containing gas to heat exchange to bring its temperature to an optimum reaction temperature and mixing a sufficient amount of $SO_2$ gas with it prior to its passage through each zone to convert a portion of the $H_2S$ in each zone into sulphur vapor and steam without raising the temperature of the gaseous admixture in any of the zones above about 830° F.; periodically shifting the flows of the mixture of $H_2S$ gas and oxidant gas and the oxidizing medium through said zones so that each zone becomes, in succession, a reactivating zone, and, in reverse order to the flow of the $H_2S$ containing gas therethrough, each a successive reaction zone; continuously withdrawing the reacted gaseous mixture from the last zone in which reaction is taking place and directing its flow through a condensing zone and there condensing the sulphur vapor to form liquid sulphur.

ERNEST B. MILLER.

REFERENCES CITED

The following references are of record in the file of this patent:

UNITED STATES PATENTS

| Number | Name | Date |
| --- | --- | --- |
| 1,922,872 | Thompson | Aug. 15, 1933 |
| 1,947,779 | Huff et al. | Feb. 20, 1934 |
| 2,270,427 | Fleming et al. | Jan. 20, 1942 |
| 2,298,641 | Schulze et al. | Oct. 13, 1942 |
| 2,384,926 | Jones | Sept. 18, 1945 |
| 2,386,202 | Fernelius | Oct. 9, 1945 |
| 2,386,390 | Fernelius | Oct. 9, 1945 |
| 2,388,259 | Fleming et al. | Nov. 6, 1945 |
| 2,431,236 | Fleming et al. | Nov. 18, 1947 |
| 2,497,095 | Nevins et al. | Feb. 14, 1950 |
| 2,534,792 | Nevins et al. | Dec. 19, 1950 |
| 2,561,990 | Miller | July 24, 1951 |

FOREIGN PATENTS

| Number | Country | Date |
| --- | --- | --- |
| 120,554 | Great Britain | Sept. 25, 1918 |
| | (Complete spec. not accepted) | |
| 267,138 | Great Britain | Dec. 15, 1927 |

OTHER REFERENCES

Perry: "Chem. Engineers Handbook," 2nd ed., pages 1276, 1277 McGraw-Hill Book Co., Inc., N. Y. C., 1941.